Inventor
Edgar Schmued
By Lyon & Lyon
Attorneys

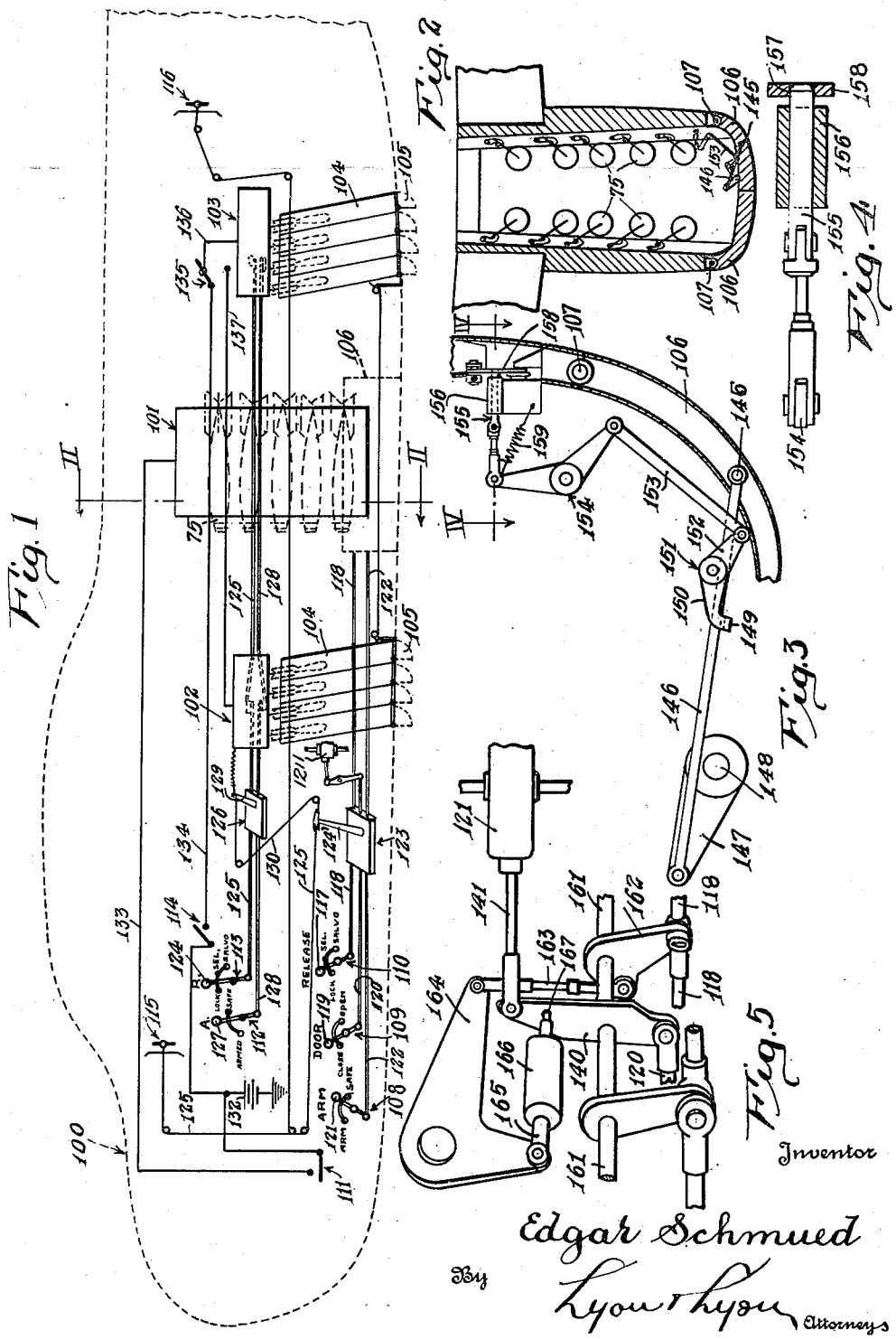

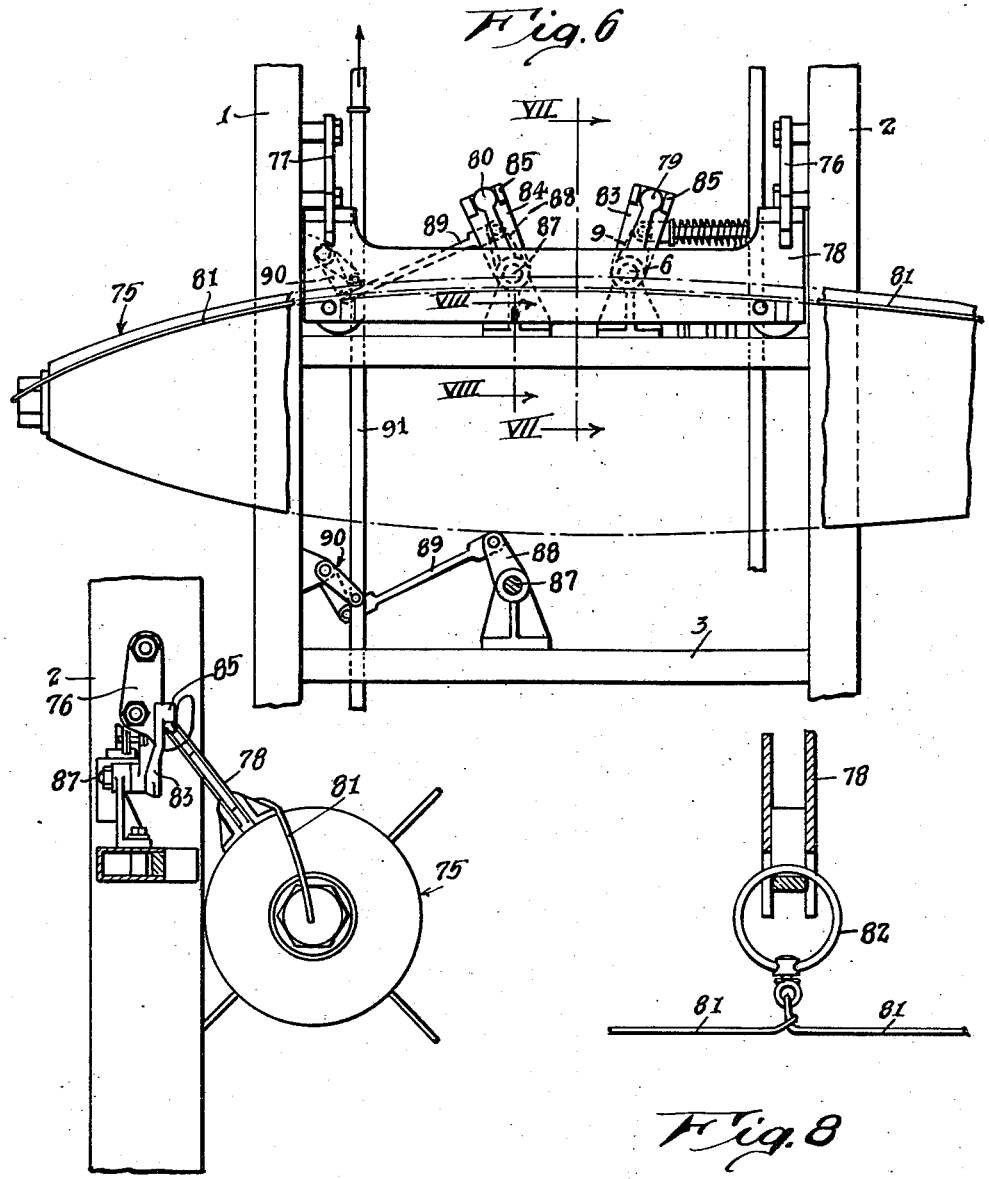

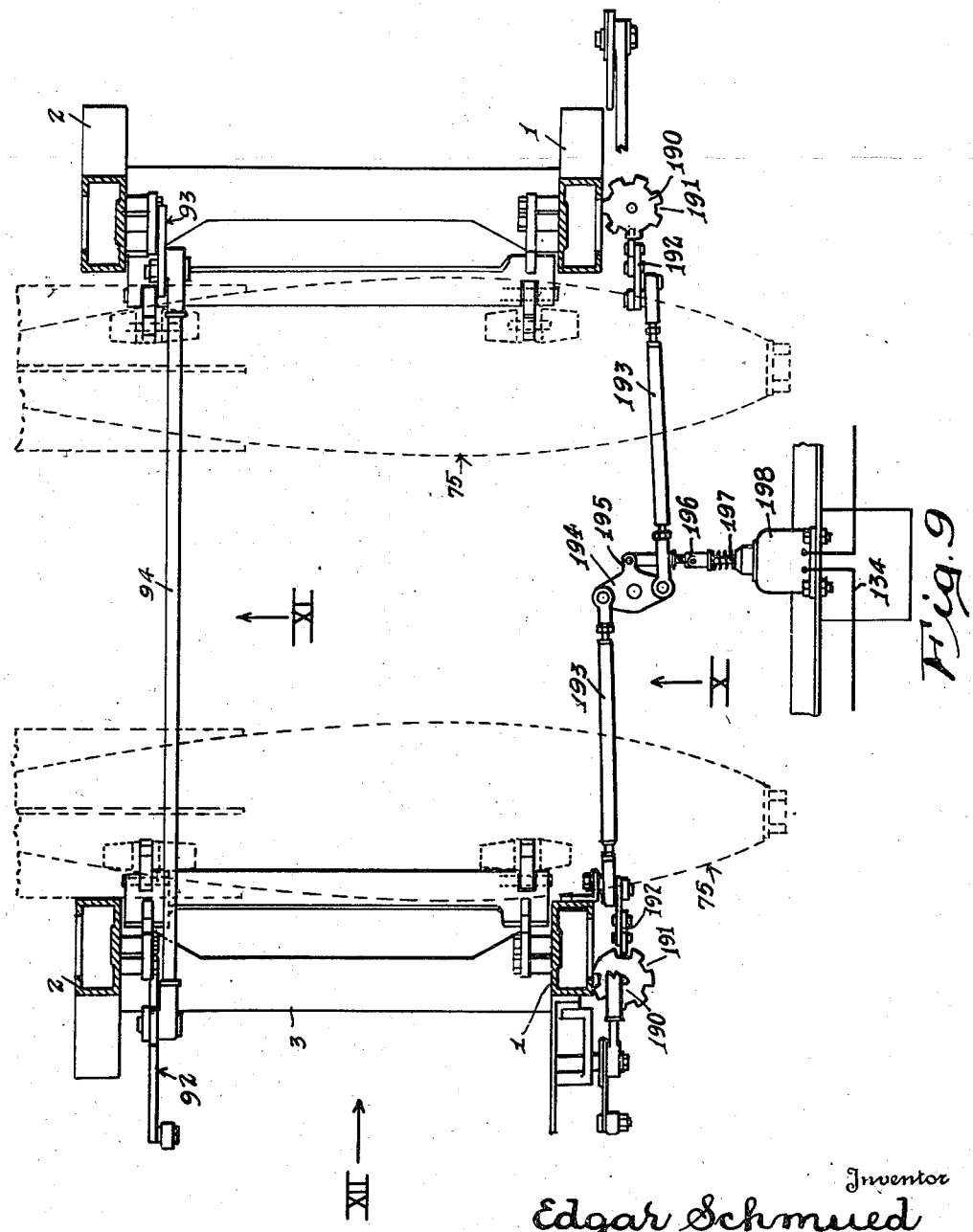

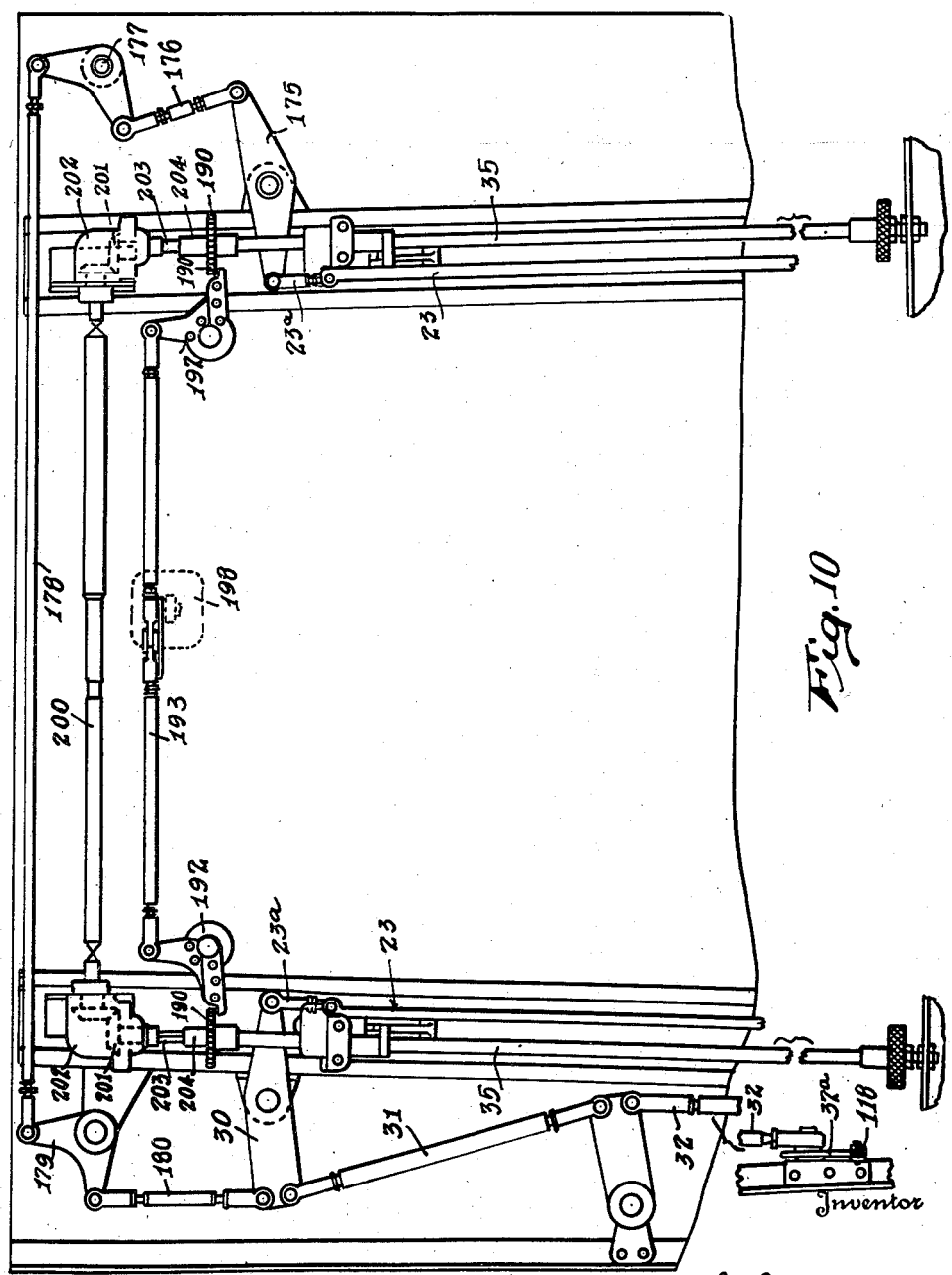

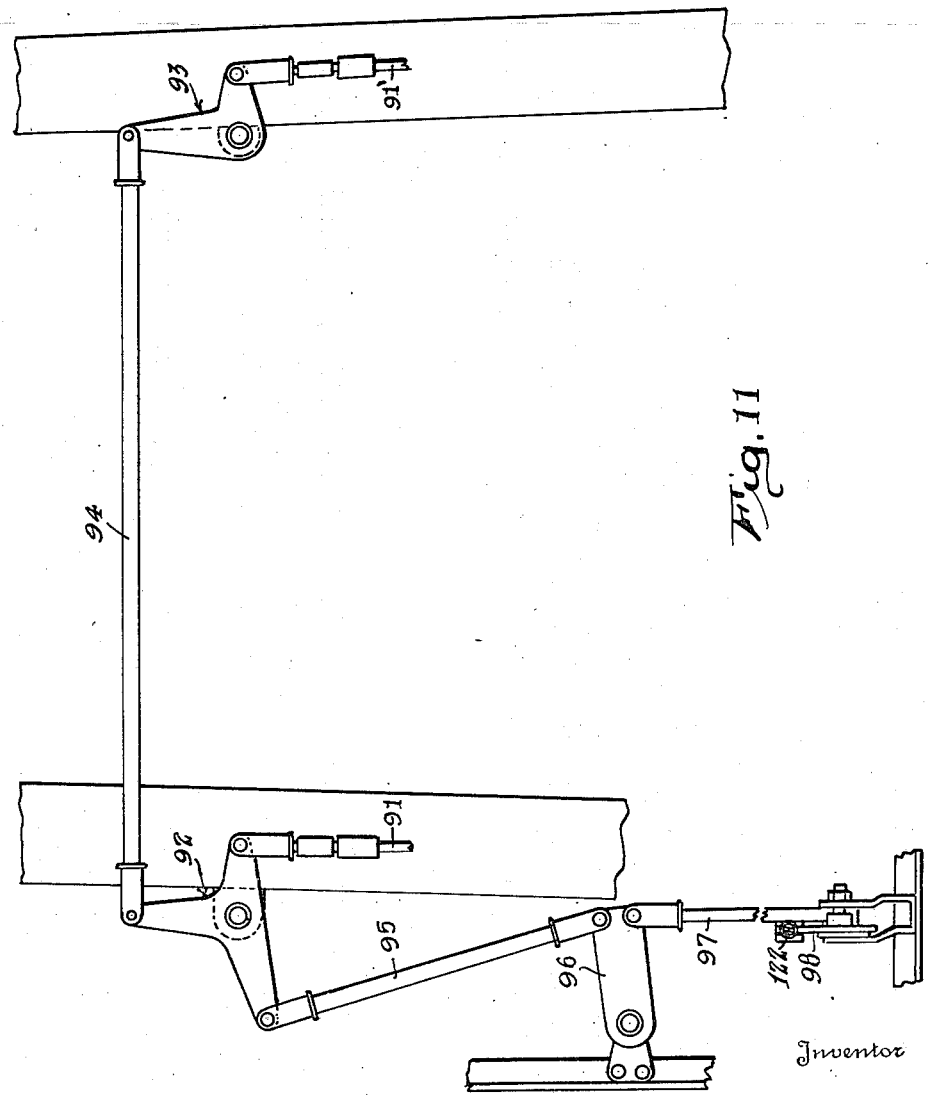

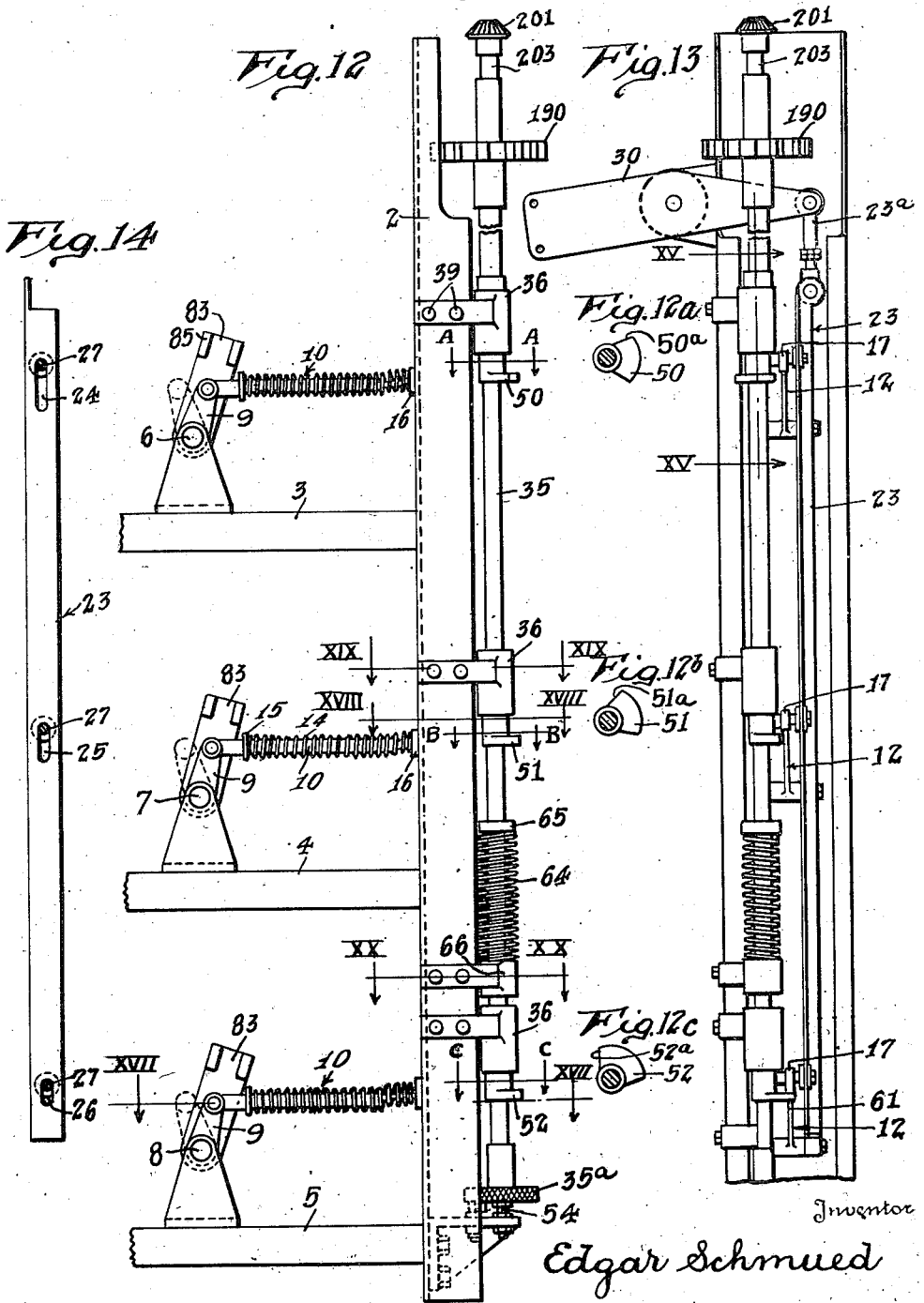

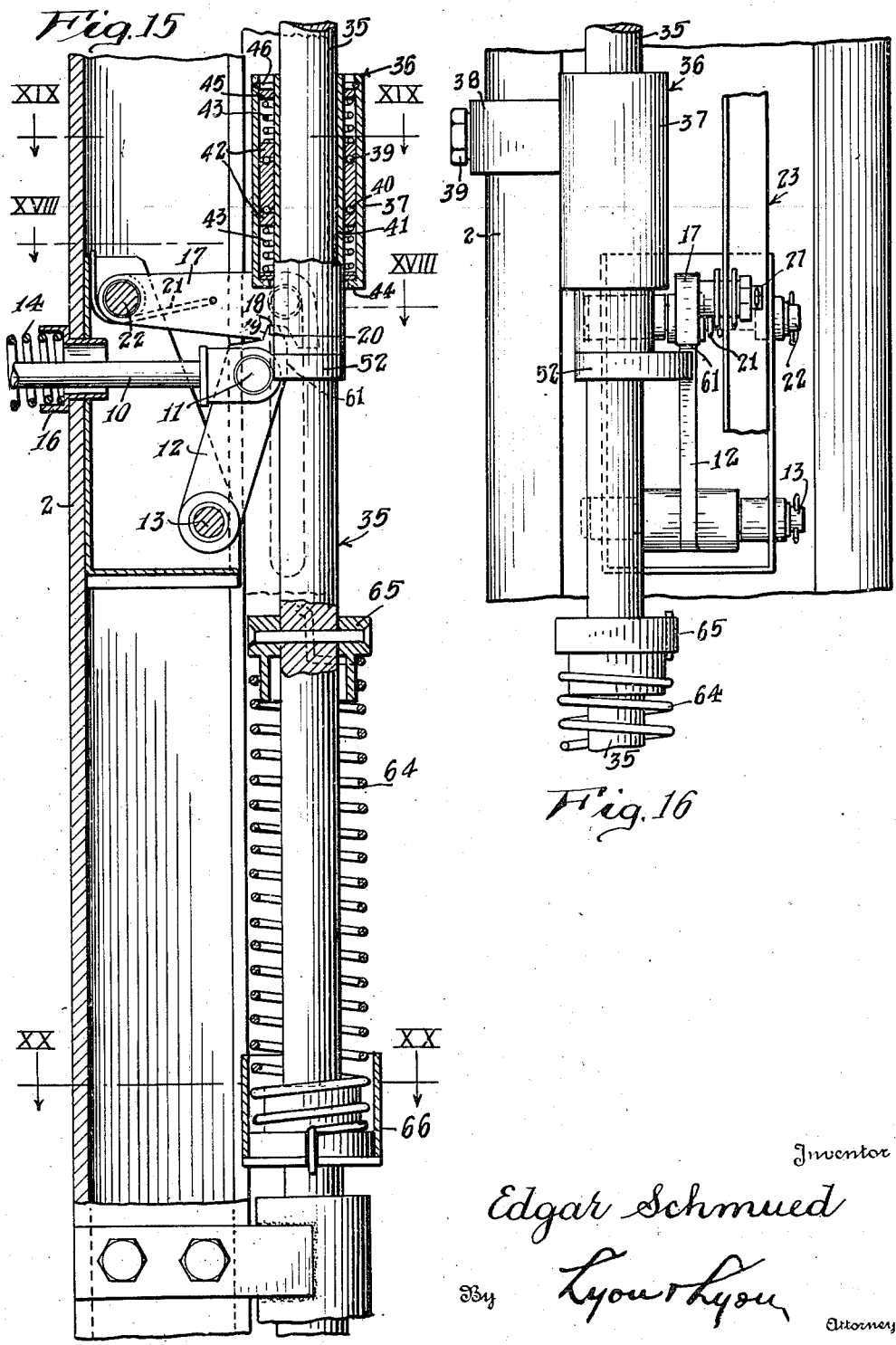

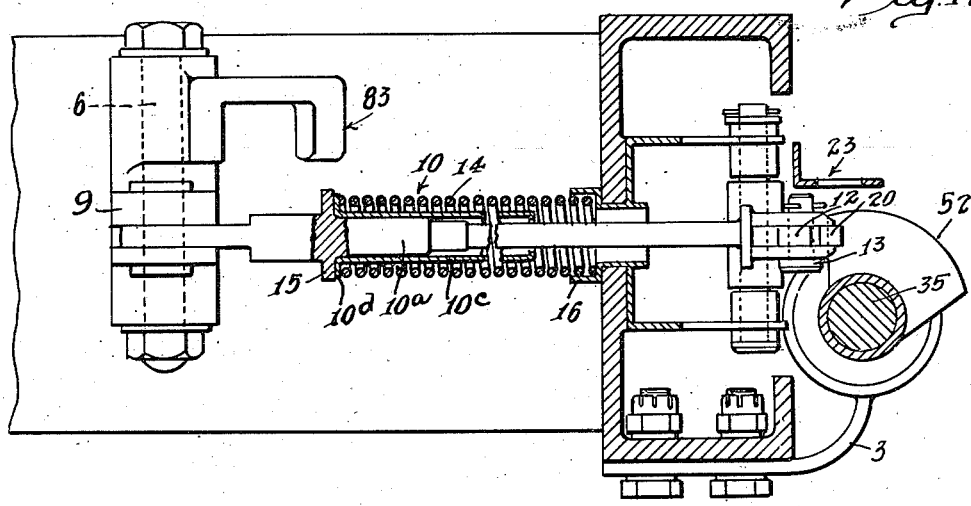
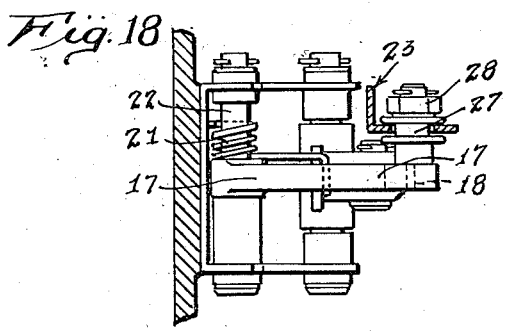
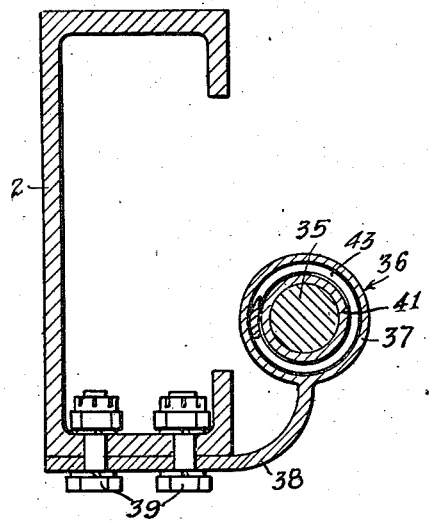
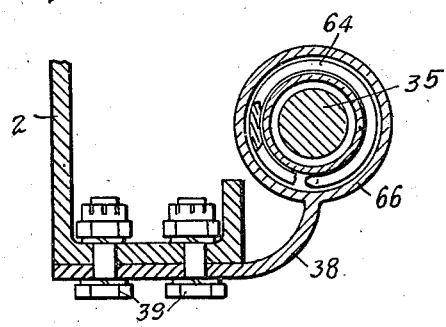

Nov. 28, 1944.  E. SCHMUED  2,363,750
BOMB CONTROL MECHANISM
Filed Sept. 18, 1939   14 Sheets-Sheet 10

Inventor
Edgar Schmued
By Lyon+Lyon
Attorneys

Nov. 28, 1944. E. SCHMUED 2,363,750
BOMB CONTROL MECHANISM
Filed Sept. 18, 1939 14 Sheets-Sheet 11

Inventor
Edgar Schmued
By Lyon & Lyon
Attorney

Nov. 28, 1944.  E. SCHMUED  2,363,750
BOMB CONTROL MECHANISM
Filed Sept. 18, 1939  14 Sheets-Sheet 12
Fig.29
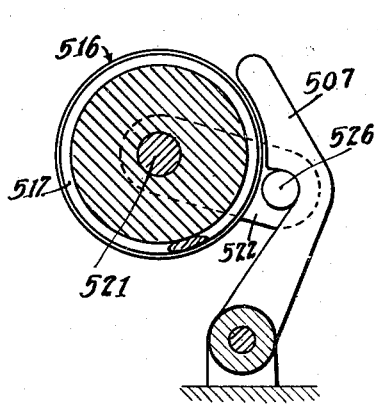
Fig.30
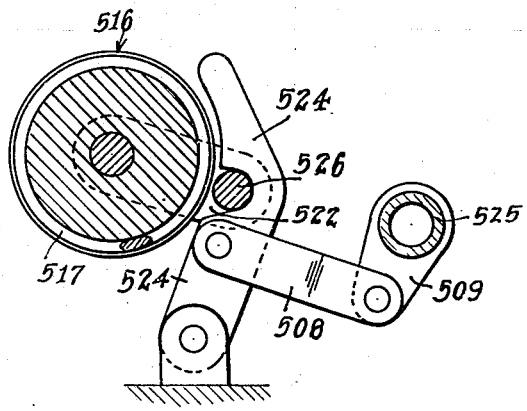
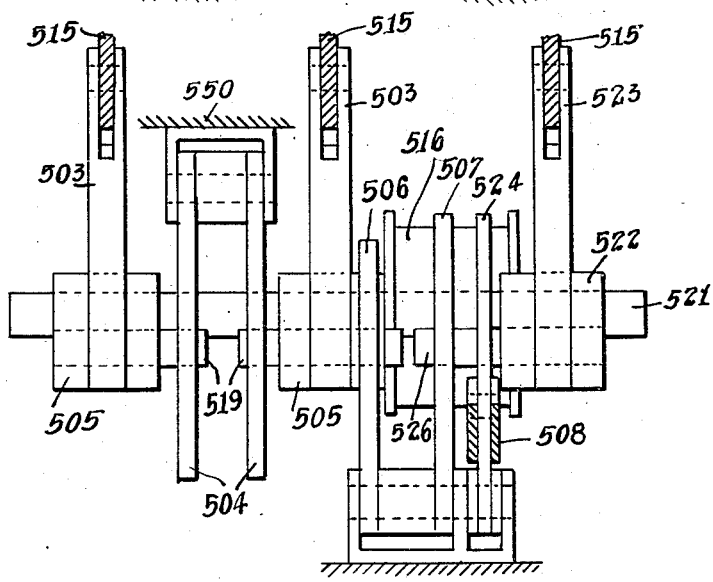
Fig.39
Inventor
Edgar Schmued
By Lyon+Lyon
Attorneys

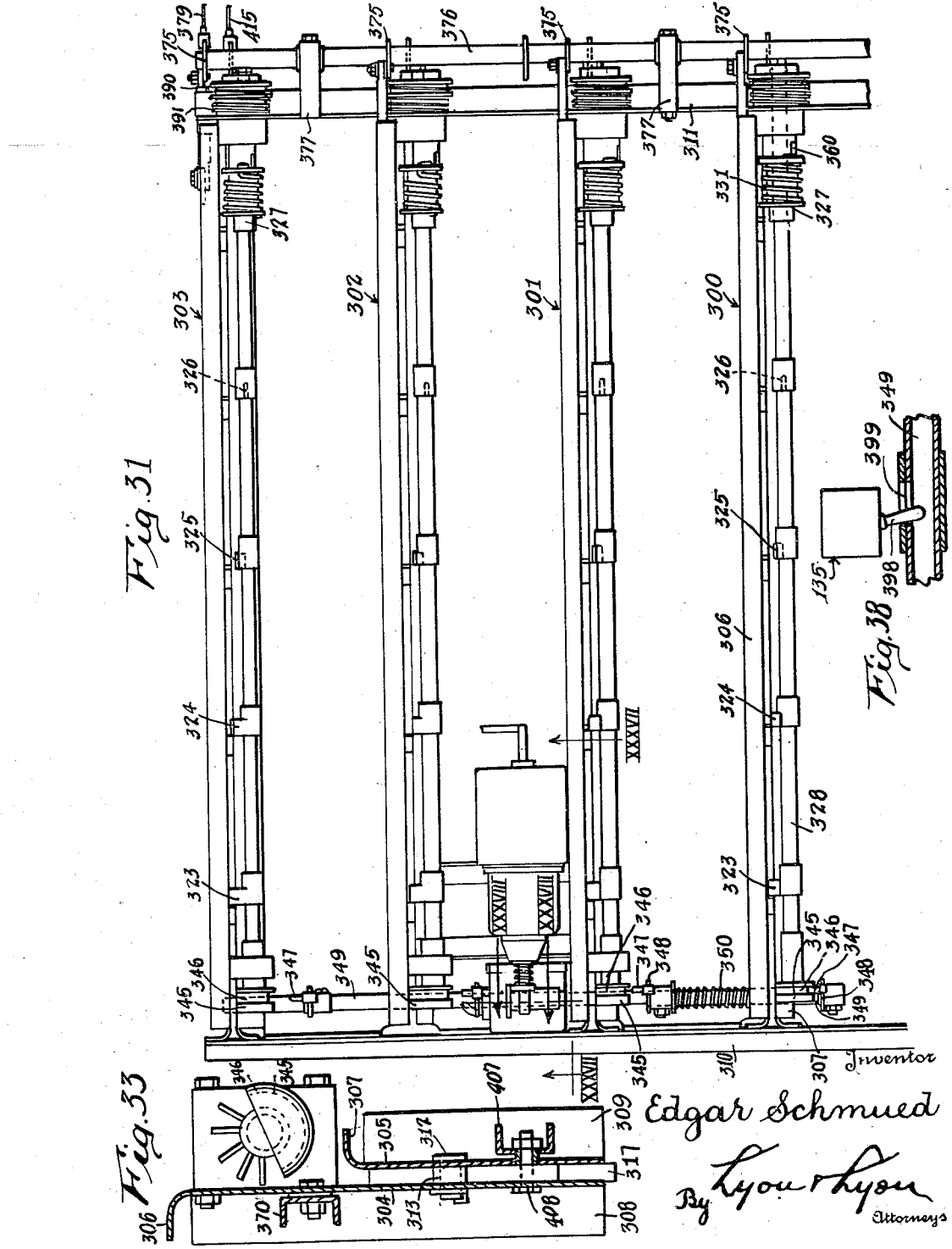

Nov. 28, 1944.  E. SCHMUED  2,363,750
BOMB CONTROL MECHANISM
Filed Sept. 18, 1939  14 Sheets-Sheet 14
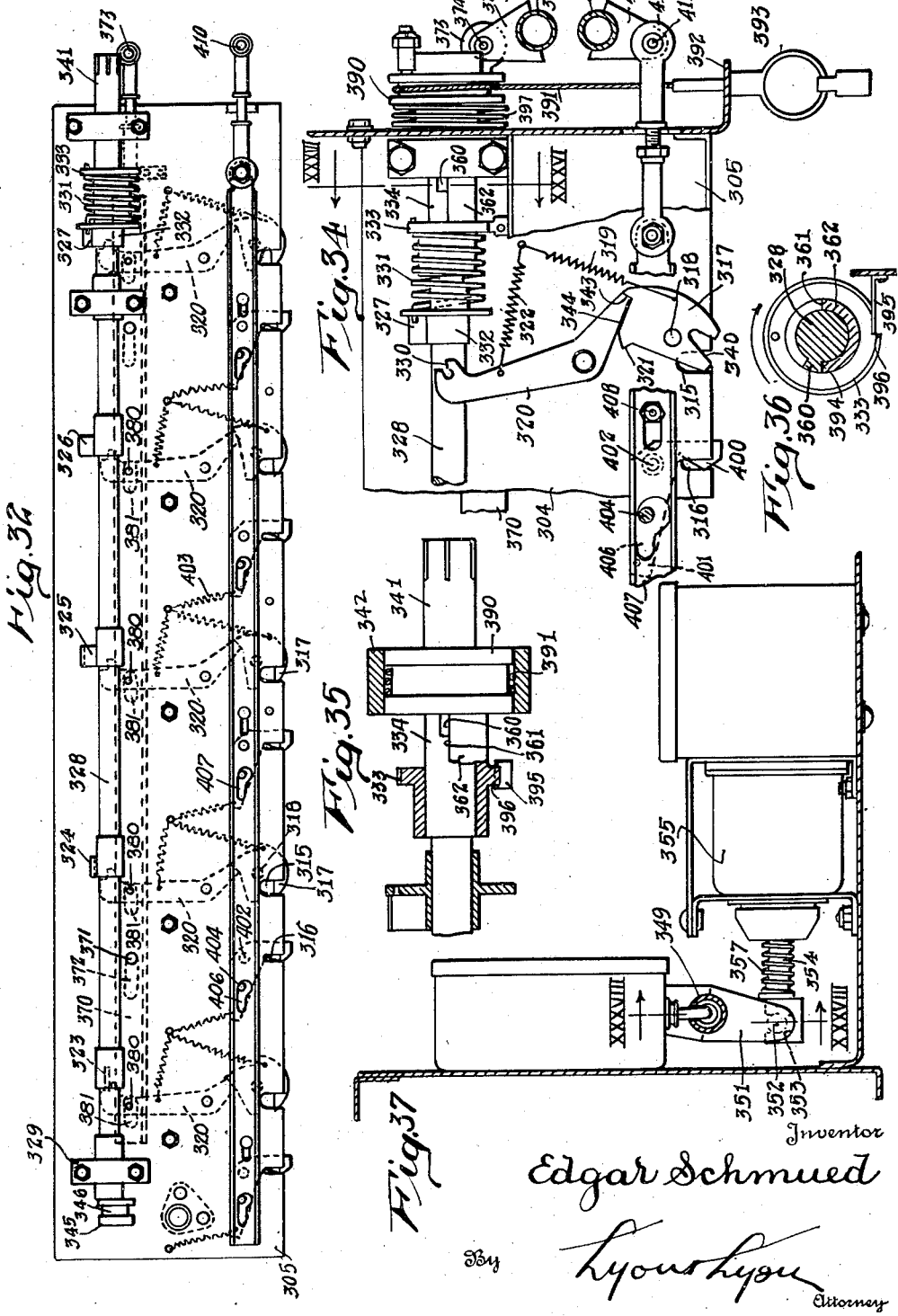
Inventor
Edgar Schmued
By Lyons Lyons
Attorney Patented Nov. 28, 1944

2,363,750

UNITED STATES PATENT OFFICE 2,363,750

BOMB CONTROL MECHANISM

Edgar Schmued, Inglewood, Calif., assignor to North American Aviation, Inc., Inglewood, Calif., a corporation of Delaware Application September 18, 1939, Serial No. 295,405

14 Claims. (Cl. 89—1.5)

This invention relates generally to control mechanisms and more particularly to mechanisms for controlling the release of aerial bombs from aircraft.

It is common for bombing aircraft to carry a relatively large number of bombs, although, of course, the number that can be carried by any given craft is less when the bombs are relatively large than when they are relatively small. In many instances, it is desirable to drop bombs one at a time at different targets, (or successively at the same target while repeatedly flying over it). On other occasions, it is desirable to discharge all the bombs substantially simultaneously in a "Salvo" at a single target. Still again, emergencies sometimes arise making it desirable to drop the entire bomb load to lighten the aircraft. Under such circumstances, it is also usually desirable that the bombs be dropped in "safe" (nonexplosive) condition as distinct from "armed" condition, so that they will effect minimum destruction where they hit.

Of course it is also essential that the possibility of accidental release of bombs, or their release in such a way as to foul each other, be eliminated. It is also desirable that the manipulation required to discharge the bombs in any of the manners specified be simplified as much as possible to avoid confusion in operation and mistakes due to human fallibility.

A general object of the present invention is to simplify the operations that must be manually performed to discharge the bombs from an airplane and at the same time make the system as nearly proof against accidental or improper release of the bombs, as is possible.

Another object is to provide a mechanism for automatically dropping bombs alternately from racks on the left and right sides of a plane in response to actuation of a single release control, thereby simplifying the operations to be performed by the bombardier while maintaining the balance of the plane automatically.

Another object is to provide a control system for a plurality of bomb racks, whereby bombs will be released one at a time in response to successive operations of a single control device by the bombardier until all the bombs in all the racks have been dropped.

Another object is to provide an emergency bomb-release system for aircraft, capable of working in conjunction with the regular control system, but functioning to drop all the bombs in "safe" condition in response to manipulation of a single emergency control device.

Still another object is to provide an emergency bomb-release mechanism functioning to discharge the bombs in "safe" condition without moving the regulator controls.

Another object is to provide, in an aircraft having a bomb compartment normally closed by a door, a door-opening mechanism and a bomb-release mechanism so interlocked that the bombs cannot be released unless the door is opened and the door cannot be closed unless the bomb-holding mechanism is locked against release.

Another object of the invention is to provide a bomb-release mechanism that can be positively locked against release.

Another object is to provide, in connection with a bomb rack for mounting bombs in vertical tiers, a control mechanism that will insure against dropping of any bomb until after the bombs therebelow have been dropped, thereby preventing fouling.

Various other more specific objects and features of the invention will become apparent from the detailed description of a particular system in accordance with the invention, which will later be described in connection with the drawing.

A modern bombing plane may be equipped to carry two general types of bombs, termed "demolation" and "fragmentation", respectively. Demolation bombs are relatively large, usually weighing from 100 to 2,000 pounds, whereas the fragmentation bombs usually weigh from 25 to 100 pounds. It has become the practice to suspend these two types of bombs in two different ways. The relatively small fragmentation bombs hang vertically suspended from a ring at the tail. The demolition bombs are suspended horizontally from two lugs near the front and rear ends, respectively, of the bomb. In view of the different modes of suspension for demolition and fragmentation bombs, respectively, different release mechanisms are required for the two types. However, both types may be used on a single airplane, with their controls more or less inter-related; and the release mechanisms for each type have common features of construction. Therefore a complete system for a single plane, including equipment for both demolition and fragmentation bombs, will now be described with reference to the drawings.

In the drawings:

Fig. 1 is a schematic layout in a vertical longitudinal plane through the fuselage of an airplane disclosing a general arrangement of bomb racks that may be employed in accordance with the invention, and showing the general arrangement of control rods, cords, etc. extending from the bomb racks to the points of manual control in the aircraft;

Fig. 2 is a cross section taken in the plane II—II of Fig. 1, and showing the general arrangement of the demolition bombs in their racks, and the doors for normally closing the bottom of the demolition bomb compartment;

Fig. 3 is a skeleton view, showing a portion of the door-controlling mechanism, and the interlock between the door and the bomb-release mechanism;

Fig. 4 is a detail view, taken in the plane IV—IV of Fig. 3;

Fig. 5 is a perspective view of the interlock mechanism between the door-control and the bomb-releasing mechanism;

Fig. 6 is a view looking at one side of the demolition bomb rack, with a bomb in place.

Fig. 7 is transverse view, partly in section, taken substantially in the plane VII—VII of Fig. 6;

Fig. 8 is a detail sectional view, taken substantially in the plane VIII—VIII of Fig. 6;

Fig. 9 is a plan view of a portion of the demolition bomb rack;

Fig. 10 is a skeleton view, taken in a transverse plane similar to that of Fig. 2, showing certain control elements of the demolition bomb rack positioned at the front end of the rack, the view being taken substantially at the position of the arrow X in Fig. 9;

Fig. 11 is a skeleton view, similar to Fig. 10, but illustrating control members at the rear end of the demolition bomb rack, the view being taken substantially from the position of the arrow XI in Fig. 9;

Fig. 12 is a skeleton view of a portion of the release mechanism for the demolition bomb rack, the view being taken looking substantially in the direction of the arrow XII in Fig. 9;

Figs. 12a, 12b and 12c are detail horizontal section views taken in the planes A—A, B—B and C—C, respectively, of Fig. 12, showing the relative positions of different cam elements of the mechanism;

Fig. 13 is a view of the same mechanism shown in Fig. 12, looking at the right side of Fig 12;

Fig. 14 is a detail elevational view of a locking bar shown in Fig. 13, Fig. 14 being taken in the direction from right to left in Fig. 13;

Fig. 15 is a vertical sectional view taken in the plane XV—XV of Fig. 13;

Fig. 16 is a detail elevational view of the mechanism shown in the upper portion of Fig. 15, Fig. 16 being taken looking from right to left in Fig. 15;

Fig. 17 is a cross section taken in the plane XVII—XVII of Fig. 12;

Fig. 18 is a cross section taken in the plane XVIII—XVIII of Figs. 12 and 15;

Fig. 19 is a cross section taken in the plane XIX—XIX of Figs. 12 and 15;

Fig. 20 is a detail cross section taken in the plane XX—XX of Figs. 12 and 15;

Figs. 27, 28, 29 and 30 are skeleton views showing certain elements of the release mechanism, the four views being taken approximately in the planes XXVII—XXVII, XXVIII—XXVIII, XXIX—XXIX, and XXX—XXX, respectively, of Figs. 23 and 26;

Fig. 31 is a plan view of one of the fragmentation bomb racks;

Fig. 32 is a side elevation of one of the units of the bomb rack shown in Fig. 31;

Fig. 33 is an end elevation view of the unit shown in side elevation in Fig. 31, the view being taken from the left end of Fig. 31;

Fig. 34 is an enlarged detail view of a portion of the mechanism shown in Fig. 32, the view being taken in side elevation similar to Fig. 32;

Fig. 35 is a skeleton view in vertical section of certain of the elements shown in Fig. 34;

Fig. 36 is a detail vertical section taken in the plane XXXVI—XXXVI of Fig. 34;

Fig. 37 is a side elevation view of the solenoid mechanism, taken approximately in the plane XXXVII—XXXVII of Fig. 31;

Fig. 38 is a detail sectional view, taken in the plane XXXVIII—XXXVIII of Figs. 31 and 37; and Fig. 39 is a cross sectional elevation taken on line XXXIX—XXXIX of Fig. 26.

Figure 21:
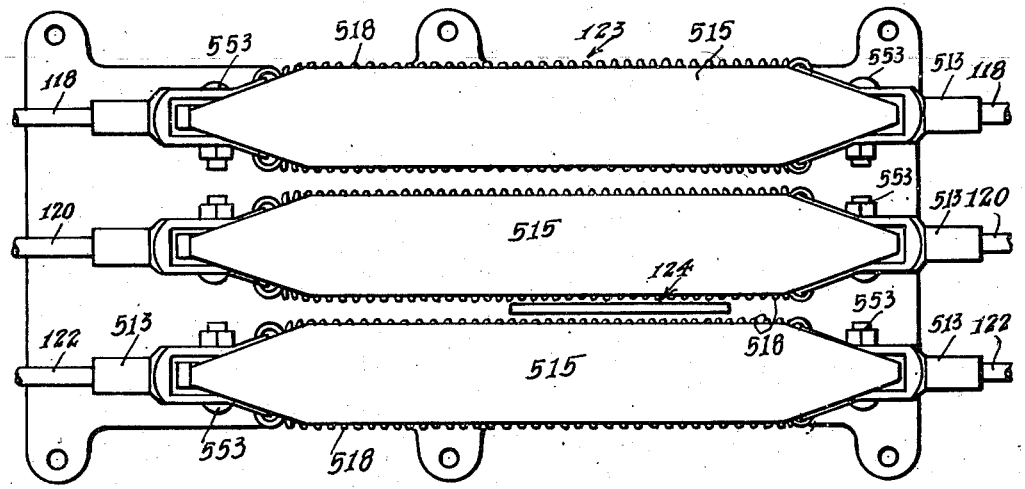
Fig. 21 is a plan view of the emergency release mechanism for the demolition bomb rack.

Referring first to Fig. 1, the dotted line 100 represents the general outline in longitudinal section of the walls of a portion of the fuselage of a bombing airplane. This plane is equipped with a demolition bomb rack 101 positioned adjacent the load center of the airplane and with two fragmentation bomb racks 102 and 103, respectively, one positioned forward and the other positioned aft of the demolition bomb rack 101. The fragmentation bomb racks support the bombs vertically in chutes 104, the lower ends of which chutes are flush with the bottom wall of the plane and are normally closed by spring closed doors 105 which swing open under the weight of the bombs, as shown in dotted lines in Fig. 1, when the bombs slide out of the chutes, and close again as soon as the bombs are clear.

The demolition bombs are substantially larger than the fragmentation bombs and are supported horizontally in the demolition bomb rack 101. It is not feasible to provide spring doors below the demolition bomb rack and hence power operated doors 106 are provided below the rack 101, these doors being shown to best advantage in Fig. 2, where it will be observed that the doors are hinged at their outer edges by hinges 107 and swing inwardly toward each other into closed position. The mechanism and control for opening and closing the doors 106 will be described later.

Separate controls are provided for the fragmentation and the demolition bomb racks, respectively. Four controls 108, 109, 110 and 111 are provided for the demolition bombs, and three controls 112, 113 and 114 are provided for the fragmentation bombs. In addition, a pair of emergency controls 115 and 116, usually positioned in different parts of the airplane, are provided.

Referring first to the controls for the demolition bombs, the control 110 comprises a handle 117 movable progressively through three positions and connected by a control rod 118 to the demolition bomb racks 101. The three positions of the lever 117 are identified as "Lock," "Sel" and "Salvo." When the lever is in "Lock" position, the demolition bombs are locked against any possible release. When lever 117 is in the center or "Sel" (meaning selective) position, the bomb rack 101 is conditioned to drop bombs one at a time in response to actuation of control 111 which consists of an electric switch. When control lever 117 is moved into "Salvo" position, all of the demolition bombs are dropped one after the other in rapid succession.

The control 109 includes a lever 119 movable between a "closed" position and an "open" position. This lever actuates a rod 120 which actuates a valve 1211 controlling flow of fluid under pressure to a hydraulically actuated mechanism for opening and closing the doors 106. Movement of the lever 119 into "open" position opens the doors 106 and movement of the lever back into "closed" position closes the doors.

Control 108 includes a lever 121 movable between a "safe" and an "armed" position. This lever is connected through a rod 122 with a mechanism in the demolition bomb rack which renders the bombs either "safe" so that they do not explode when dropped, or "armed" so that they do explode when dropped.

All three of the control rods 118, 120 and 122 extend through an emergency release mechanism 123 having a control lever 124' extending therefrom and connected through a cable 125 with both the emergency control 115 and the control 116. When the emergency control mechanism 123 is in normal position the rods 118, 120 and 122 are in effect simply extended through the mechanism as though it were not there. When the lever 124 is pulled to the left in response to actuation of either control 115 or 116, it shortens the rods 120, 122 and 118 successively in the order named so as to first open the doors 106, "safe" the bombs to prevent them from exploding when dropped, and then drop them all.

The controls for the fragmentation bombs are similar to those described for the demolition bombs, except that the door control is omitted, since the doors 105 on the fragmentation bomb chutes are spring closed, and open and close automatically. Thus the control 113 comprises a lever 124 movable through a "Lock," a "Sel," and a "Salvo" position, and connected by a rod 125 extending through an emergency release mechanism 126 to the fragmentation bomb racks in both the forward bay 102 and the rear bay 103. When this lever 124 is in "Lock" position all the bombs in the fragmentation racks are positively locked against release. When lever 124 is in "Sel" position, the bombs may be discharged one at a time in response to consecutive closure of the switch 114. When the lever 124 is moved into "Salvo" position, all of the fragmentation bombs are automatically released in rapid succession.

The control 112 is the arming control and includes a lever 127 movable between an "armed" position and a "safe" position and connected to a control rod 128 extending through the emergency release mechanism 126 to the bomb racks 102 and 103. This functions exactly the same as the control 108, previously described.

The emergency release mechanism 126 includes a lever 129 connected by a cable 130 to the lever 124' of the demolition bomb emergency control mechanism so that when the latter is actuated the fragmentation emergency release mechanism 126 is also actuated to "safe" the fragmentation bombs and then dump them all.

The demolition bomb control switch 111 functions to complete a circuit from a source of current 132 to a conductor 133 extending to the demolition bomb rack 101, where it connects with a solenoid to be described later. The switch 114 serves to apply current from the source 132 to a conductor 134, which connects through a switch 135 either to a conductor 136 extending to a solenoid (not shown in Fig. 1) in the rear fragmentation bomb rack 103 or through a conductor 137 to a solenoid in the forward fragmentation bomb rack 102.

The general assembly having been briefly outlined with reference to Fig. 1, various portions of the system will now be described separately in detail with reference to other figures of the drawings.

*Demolition bomb rack door-control*

As has been previously indicated, the doors 106 below the demolition bomb bay, may be opened and closed by suitable hydraulic motors, the fluid supply to which is controlled by the valve 1211. The particular motor and valve system employed does not constitute a part of the present invention, and such devices are well-known in the art; hence they will not be described herein. Suffice it to say that longitudinal movement of the rear end of control rod 120 functions to swing the lower end of a lever 140, fulcrumed intermediate its ends and connected at its upper end to the plunger 141 of the hydraulic valve 1211.

In this system, it is essential to prevent any possibility of bombs being released from the rack in the bay 101 unless the doors 106 are in open position. To this end, I provide two interlocks between the bomb-release mechanism, and the door-control mechanism. One of these interlocks prevents movement of the release rod 118 out of locked position unless the doors 106 are open and the other interlock prevents movement of the door-control rod 120 into position to close the doors 106 unless the release rod 118 has been returned to locked position.

The mechanism for preventing movement of the release bar 118 out of locked position until the doors 106 have been opened, will now be described with reference to Figs. 2, 3 and 4

Referring first to Fig. 2, one of the doors 106 has pivotally connected thereto at a point 145 one end of a rod 146, the other end of which is connected to the outer end of a crank 147 pivotally mounted for rotation about an axis 148. This rod 146 is positioned directly above a lip 149 on one arm 150 of a lever 151 which is fulcrumed substantially at the center and has a second arm 152 connected through a rod 153 and a bellcrank lever 154 to a lock bolt 155 slidably mounted in a journal member 156. This lock bolt 155 normally projects into an aperture 157 (Fig. 4) in an arm 158 connected to the release bar 118 when the latter is in locked position. Figs. 2, 3 and 4 show the position of the mechanism when the doors are closed and it will be observed that the bolt 155 is entered into the hole 157 in the arm 158, thereby preventing movement of the latter out of locked position. The bolt is yieldably retained in locked position by a return spring 159.

When the doors are opened, the rod 146 swings to the right (with reference to Fig. 3), and the left end of the rod moves first forwardly and then downwardly as the crank 147 rotates about its axis 148. As the door approaches fully open position, the end of the crank 147 and the left end of the rod 146 are moving almost directly downwardly and as the door reaches fully open position, the rod 146 engages the lip 149 on the arm 150 of lever 151, rotating the latter in counterclockwise direction to shift the rod 153, the lever 154 and the bolt 155, carrying the latter, to the left out of engagement with the arm 158 so that the latter can thereafter be moved out of locked position either by manipulation of the control 110 (Fig. 1) or of the emergency release mechanism 123 in a manner to be described later.

The other interlock on the door mechanism, namely that for preventing closure of the doors unless the release mechanism has been moved into locked position, will be explained with reference to the perspective view of Fig. 5, in which it will be observed that the door control rod 120 is connected to the lower end of the lever 140 fulcrumed intermediate its ends on a cross shaft 161. The upper end of the lever 140 is connected, as previously described, to the control rod 141 extending to the valve 121 controlling the hydraulic door-opening and closing mechanism. It will be sufficient at this point to state that when the rod 141 is moved to the left the doors are closed and when it is moved to the right, the doors are opened. When the doors have been opened, by movement of the rod 141 to the right in the manner described, the next step toward release of a bomb or bombs is to move the release control out of locked position into either selective or Salvo position. Movement of the release control out of locked position causes the control rod 118 (Figs. 1 and 5), to be moved to the left. Although rod 118 extends past the valve mechanism 121 to the demolition bomb rack 101 (Fig. 1), it is linked to a bellcrank lever 162 also fulcrumed on the cross shaft 161, which lever follows all movements of the rod 118. Any movement of the rod 118 to the left out of locked position rotates the bellcrank lever 162 which in turn is connected to a rod 163 connected to a second bellcrank lever 164 which communicates motion of lever 162 to a lock bolt 165 slidably mounted in a journal 166 for movement toward and away from the lever 140. When the doors are in open position, the lever 140 has a hole 167 therein aligned with the bolt 165 and any movement of the release rod 118 away from locked position causes the bolt 165 to be moved into the hole 167, thereby preventing movement of the valve-control rod 141 into position to close the doors. It follows that after the doors have once been opened they cannot be released until and unless the bomb-release control has been moved into locked position, thereby positively preventing any release of a bomb from the demolition bomb rack while the doors thereunder are in closed position. Of course movement of the release mechanism back into locked position, moves the rod 118 (Fig. 5) to the right and retracts the bolt 165 from the hole 167 in lever 140, restoring control of the doors to the operator who can then close them by manipulating the door-control lever 119 into closed position.

*Demolition bomb racks and control mechanism therefor*

As has been previously explained, the mechanism within the demolition bomb rack 101 is under the control of the rods 118 and 122, which extend therefrom to the control mechanism 108 and the release control mechanism 110 and under the control of the electric circuit 133 extending to the firing switch 111. The actual construction of the demolition bomb rack and the mechanisms responsive to the rods 118, 122 and the circuit 133, will now be described with particular reference to Figs. 2, and 6 to 20, inclusive.

As shown in Fig. 2, the demolition bombs 75 are positioned horizontally fore and aft of the airplane and positioned in two substantially vertical tiers on opposite sides of the fuselage. The mechanisms on each side of the craft, as shown in Fig. 2, are identical.

Referring to Figs. 6 and 7, it will be observed that the bomb rack on the right side of the fuselage comprises a pair of vertical frame members 1 and 2, respectively, having mounted thereon sturdy hooks 77 and 76, respectively, which hooks engage the opposite ends of bomb shackles 78, which shackles in turn are releasably secured to the bombs 75. The construction of the bomb shackles 78 does not constitute a part of the present invention and will therefore not be described in detail. Suffice it to say that the shackle has as part of its essential structure a release arm 79 and an arming arm 80. When the release arm 79 is rotated through a small arc in a counterclockwise direction (with reference to Fig. 6), a mechanism within the shackle 78 is actuated to release the bomb so that it drops clear of the shackle 78.

The function of the arming arm 80 is to determine whether the bomb shall be dropped in armed condition so that it will explode, or in safe condition so that it will not explode. The particular type of bomb shown in Fig. 6 is provided with both nose and tail fuses and a wire 81 extends from these fuses and connects to a ring 82 (Fig. 8) which is releasably attached to the bomb shackle 78 under the control of the arm 80. When the arm 80 is in the position shown in Fig. 6, it is in "safe" position, in which the ring 82 will be released from the shackle in response to a slight pull. Therefore if the bomb is dropped while the arm 80 is in safe position, the ring 82 will pull away from the shackle and drop with the bomb; likewise, the wire 81 will not be pulled away from the nose and tail fuses and the latter will not be conditioned to explode the bomb. On the other hand, if, prior to the dropping of the bomb, the arm 80 is moved clockwise (with respect to Fig. 6) through a small arc, a mechanism within the shackle 78 is conditioned to positively retain the fuse ring 82 (Fig. 8) so that when the bomb is dropped the wire 81 is pulled away from the nose and tail fuses. This pulling away of the wire conditions the fuses so that they will detonate the bomb in a desired manner either after a predetermined lapse of time or upon impact.

As previously stated, the present invention does not reside in the specific construction of the bomb or the bomb shackle described, but only in the mechanism which cooperates with such a shackle to control the release and the arming of the bomb. In connection with the bomb shackle, it need only be remembered that so long as the release arm 79 is in clockwise position the bomb is locked against release and so long as the arming arm 80 is in left position the bomb is in safe condition so that it will not explode if dropped.

There are mounted on the bomb racks intermediate the vertical frame members 1 and 2, a pair of actuating arms 83 and 84, respectively, which actuate the arms 79 and 80, respectively. These arms 83 and 84 have fingers 85 which engage the ball ends of the arms 79 and 80, irrespective of the exact positions of the latter, which vary according to the dimensions of the bomb supported thereby. Thus it will be observed from Fig. 7 that the bomb shackles 78 extend outwardly and downwardly at an angle from the suspending hooks 76 and 77 and the larger the bomb, the more nearly horizontally the shackles 78 extend. The fingers 85 provide for a substantial flexibility in this respect, while preserving the operating connection between the arm 79 and the arm 83, and between the arm 80 and the arm 84.

Each of the arms 84 is fixed on a shaft 87 which is rotatably mounted and has an arm 88 thereon connected by a rod 89 to a bellcrank lever 90, the other arm of which is pivotally connected to a vertically extending control rod 91.

The control rod 91 extends vertically the full height of the rack and connects to the bellcrank lever 90 associated with each pair of bombs on that side of the rack. A similar mechanism is positioned on the opposite side of the rack. Thus referring to Fig. 11, which is a view looking aft, the rod 91 is on the right side of the fuselage and a similar rod 91' is on the left side of the fuselage and associated with the bombs on the left side. It is desired to actuate all of the arming controls on all of the bombs on both sides of the rack simultaneously and to this end the two rods 91 and 91' (Fig. 11) are interconnected for simultaneous movement through bellcrank levers 92 and 93 and overhead interconnecting rod 94. The bellcrank lever 93 has only two arms, one connected to the rod 91' and the other connected to the overhead rod 94. The lever 92, however, in addition to having an arm connected to the rod 91 and an arm connected to the overhead rod 94, has a third arm connected to a rod 95 which is connected through a pivotally mounted guidearm 96 to a rod 97 which extends to points adjacent the lower portion of the bomb rack and there connects through a bellcrank lever 98 with the arming rod 122, which, as previously described with reference to Fig. 1, connects to the arming control mechanism 108.

As shown in Fig. 1, the arming control lever 121 is in safe position and the rod 122 has been moved forwardly, thereby raising the links 97 and 95 (Fig. 11) and lowering the rods 91 and 91', which places all of the arms 84 (Fig. 6) in safe position. However, when the arming lever 121 in Fig. 1 is moved forwardly into armed position, the rod 122 is moved rearwardly, thereby pulling the rods 97 and 95 (Fig. 11) downwardly and lifting the rods 91 and 91' (Fig. 6) which shifts the bellcrank lever 90 and the link 89 to move the arms 84 into armed position.

Referring again for the moment to Fig. 6, the release control arm 83 is mounted for rotation with a shaft 6 having an arm 9 thereon which is actuated by a mechanism to be described under the ultimate control of the release mechanism 110 and switch 111 (Fig. 1) previously referred to.

Thus referring to Fig. 12 the mechanisms for actuating three vertically disposed bomb shackles are disclosed, the uppermost mechanism including the shaft 6, previously described, the next one below having a similar shaft 7, and the one below that having a similar shaft 8. These shafts 6, 7 and 8 are rotatably supported on three cross members 3, 4 and 5, respectively, which extend between the vertical frame members 1 and 2. Also each of the shafts 6, 7 and 8 has a crank 9 thereon for oscillating the same. Each of the cranks 9 is actuated between the position shown in full lines and that shown in dotted lines in Fig. 12, by a tie rod 10 which is pivotally connected at its left end to the associated crank 9 and extends through an aperture provided therefor in the frame member 2 where it is pivotally connected by a pin 11 (Fig. 15) to the upper end of a cocking lever 12, the lower end of which is pivotally supported from the frame 2 by a pin 13.

Each tie rod 10 is constantly yieldably urged to the left by a coil spring 14 (Figs. 12 and 15) surrounding the rod and compressed between a shoulder 15 near the left end of the rod and a spring seat 16 mounted in the aperture in the frame 2 through which the rod 10 extends.

Although the tie rod 10 may be constructed in many different ways, a simple and desirable construction is shown in the detailed view of Fig. 17. Thus it will be observed from Fig. 17 that the tie rod 10 comprises an inner member 10a having the shoulder 15 thereon, and an outer member 10c having a flange 10d, which rests against the right face of the shoulder 15 and receives the spring 14. The pressure of the spring holds the flange 10d against the shoulder 15, and the member 10c, which is of only slightly smaller diameter than the spring 14, serves as a guide for the spring.

It will be observed from Fig. 12 that the spring 14 tends to urge the crank 9 and associated shaft 6 into bomb-releasing position, but is restrained from doing so under normal circumstances by a locking pawl 17 (Fig. 15) which has a notch 18 defining a shoulder 19 which engages a tip portion 20 on the upper end of the cocking-lever 12. The pawl 17 is constantly yieldably urged downwardly into engagement with the cocking-lever 12 by a torsion spring 21 which is wound around a pin 22 on which the pawl 17 is pivotally mounted.

The tie rod, cocking-lever and locking pawl structure described with particular reference to the mechanism associated with the upper shaft 6 (Fig. 12) is duplicated therebelow in the structures for controlling shafts 7 and 8, all of the cocking-levers and locking pawls being in vertical alignment and mounted on the frame member 2, which, as clearly shown in Fig. 17, is of channel section so that it contains, to a certain extent, the cocking-levers and associated mechanisms.

To normally positively retain all the locking pawls 17 in lowermost position, in which they lock their associated cocking-levers 12 against release, a vertically movable locking bar 23 (Fig. 13) is provided, this bar extending alongside the outer ends of the locking pawls 17 and having three slots 24, 25 and 26 therein, which receive pins 27 (Fig. 18) extending from the three respective locking pawls 17. The locking bar 23 may be made in various shapes, but in order to provide ample rigidity, it is desirable to make it of angle section, as shown in Fig. 18, the slots 24, 25 and 26 being provided in one web thereof. This locking bar 23 is guidingly supported against lateral movement by the locking pawls 17, through the pins 27 having nuts 28 thereon, but is movable vertically to lock, unlock, or release, the locking pawls 17. Vertical movement of the bar 23 is effected through a link 23a and a lever 30 rotatably supported on the frame 2, the lever being connected at its opposite end (Fig. 10) through downwardly extending linkage rods 31 and 32 to one arm of a bellcrank lever 32a, the other arm of which connects to the release rod 118 (Fig. 1) extending forward to the control compartment. Therefore, by moving the rod 118, the lock bar 23 is moved up or down.

When the lock bar 23 is held in lowermost position, as shown in Fig. 14, the upper ends of the three slots 24, 25 and 26 bear downwardly against the pins 27 projecting from the three locking pawls 17 and positively prevent upward movement of the locking pawls and resultant release of the cocking-levers 12. However, by moving the locking bar 23 upwardly a short distance insufficient to engage the lower end of any of the slots 24, 25 and 26 with the pins 27, the locking pawls 17 are unlocked so that they can be lifted to release the cocking-levers 12 by an independent means, to be described later. This unlocked position of the bar 23 corresponds to the "Sel" position of the control lever 117 in Fig. 1, and is employed when it is desired to release bombs one at a time at relatively long or irregularly spaced intervals. However, when it is desired to release all of the bombs as nearly simultaneously as is feasible, then the control lever 117 is moved into "Salvo" position, which moves the bar 23 upwardly to the limit of its travel, causing the lower ends of the slots therein to engage the pins 27 and positively lift the locking pawls 17 to release the cocking-levers 12 and tie rods 10. However, release of the lower pawls prior to release of the upper pawls, is automatically taken care of under such circumstances by the fact that the slots 24, 25 and 26 are progressively shorter from top to bottom, so that the pin in the lower slot 26 is first lifted, then the pin associated with the slot 25, and, last, the pin associated with the slot 24. This automatically insures that when the bombs are released in a "Salvo" by upward movement of the locking bar 23, the bombs in the lower tiers will be released before the bombs in the tiers thereabove are released, thereby preventing fouling of the bombs.

The mechanism shown in detail in Figs. 12, 13 and 14 is associated with the right side of the demolition bomb rack as indicated by the arrow XII in Fig. 9. This mechanism appears on the left side of the drawing in Fig. 9 because the top of the sheet corresponds to the rear end of the bomb rack. As has been previously described, bombs are hung on each side of the demolition bomb compartment (see Fig. 2) and the mechanism for supporting and releasing the bombs on the left side of the bomb compartment (the right side of the drawing in Fig. 9) is identical with that on the other side, described. Furthermore, it is desirable to control the locking bars associated with the racks on both sides simultaneously in response to movement of the single release rod 118 (Figs. 1 and 10). To this end, the release bar 23 on the left side of the rack (the right side of the drawing in Fig. 10), has its link 23a connected to a lever 175 which in turn is connected through a link 176 a bellcrank lever 177, a cross tie rod 178, a bellcrank lever 179 and a link 180 to the lever 30 so that whenever lever 30 is moved in response to the movement of the release control rod 118 both of the lock bars 23 on the right and left side of the frame are moved upwardly or downwardly in unison to simultaneously either lock all the bomb mechanisms, place them all in condition for selective release, or release them in "Salvo."

To selectively release the different locking pawls one at a time, a solenoid-actuated shaft 35 (Fig. 12) is provided. This shaft 35 extends vertically alongside the frame member 2 and is guided for vertical movement by bearing members 36 which are secured to the frame 2. Referring to Figs. 15 and 19, each of these bearing members 36 comprises an outer sleeve member 37 anchored by a bracket 38 and bolts 39 to the frame 2, which sleeve 37 functions as an outer race cooperating with two annular rows of ball bearings 39 and 40. These ball bearings 39 and 40 also contact an inner sleeve 41 which is tightly fitted on the shaft 35. Obviously the balls 39 and 40 guide the shaft 35 for free rotary motion with respect to the sleeve 37. The balls 39 and 40 also guide the sleeve 41 and shaft 35 for relatively free vertical movement within the sleeve 37. To this end the annular rows of ball bearings 39 and 40 are vertically supported by a ball cage 42 which is yieldably supported vertically by coil springs 43 positioned thereabove and therebelow and compressed between the ball cage and stop members on the sleeve 37. The lower stop member may be formed by turning the lower end of sleeve 37 inwardly to constitute a flange 44 and the upper stop means may be constituted by a ring 45 held in place by a spring retainer ring 46 expanded into an annular groove in the upper end of the sleeve 37. The springs 43 are relatively weak so that while they serve to normally center the bearings 39 and 40 between the ends of the sleeve 37, they readily yield and permit the balls 39 and 40 to roll vertically between the sleeves 37 and 41 in response to limited vertical movement of the shaft 35.

The shaft 35 is provided with a plurality of segmental arms 50, 51 and 52, (Figs. 12 and 13) rigidly attached thereto or formed integrally therewith. It is convenient to form the arms integrally with the sleeves 41 which are fitted tightly on the shaft 35 and preferably locked thereto by suitable set screws or rivets (not shown).

These arms 50, 51 and 52 are so spaced along the shaft 35 that in the normal and lower position of the shaft 35 the different arms are substantially on a level with the different tie rods 10 and immediately below the levels of the lower edges of the associated locking pawls 17 so that all the arms are normally out of contact with the locking pawls 17, but function to elevate the pawls when the shaft 35 is rotated into position to bring an arm below its associated locking pawl, and the shaft is then elevated.

The lowermost position of the shaft 35 is determined by an adjustable stop 54 (Fig. 12) on the frame 2, which stop contacts the extreme lower end of the shaft 35. A handwheel 35a is provided on the lower end of shaft 35 for manually turning it.

In order to effect selective release of the three locking pawls 17 (Fig. 15) one at a time in automatically predetermined sequence so as to actuate first the lower shaft 8 (Fig. 12), then the middle shaft 7, and last the upper shaft 6, the segmental arms 50, 51 and 52 are angularly displaced about the axis of the shaft 35 so that in any one position of rotation of the shaft only one of the arms is positioned below its associated locking pawl 17.

Thus referring to Figs. 12—A, 12—B and 12—C, it will be observed that the upper arm 50 occupies a position angularly disposed in clockwise direction with respect to the lower arm 52, and that the middle arm 51 occupies a position angularly intermediate the position of arms 50 and 52.

As shown in Fig. 12, the shaft 35 is in extreme clockwise position (the direction being taken looking down from the top of Fig. 12) and is retained in this position by contact of the leading edge 52a of arm 52 with a vertical face 61 on the outer edge of the cocking lever 12 associated therewith (Figs. 13, 15, 16 and 17). In this position a portion of the arm 52 is positioned directly below the outer end of the locking pawl 17 which holds the associated cocking lever 12 in cocked position, so that when the shaft 35 is elevated (by mechanism to be described later), the arm 52 engages its associated locking pawl 17 and lifts it to thereby release the cocking lever 12 and permit actuation of the lowermost shaft 8 (Fig. 12) into releasing position by the associated spring 14. However, this initial lifting of the shaft 35 cannot release the upper shafts 7 and 6, because in the position of orientation of the shaft 35 described, the arms 51 and 50 are displaced out of vertical alignment with their associated locking pawls. In operation, the shaft 35 is lifted only momentarily and then immediately restored to its lowermost position both by the force of gravity and by the force of a helical spring 64 concentrically disposed about the shaft 35 and secured at its upper end to a collar 65 anchored to the shaft and at its lower end to a bracket member 66 (Figs. 15 and 20) anchored to the frame 2. The spring 64 is tensioned both vertically and circumferentially so as to not only supply a vertical restoring force to the shaft but also apply a torque to the shaft, tending at all times to rotate it in counterclockwise direction.

As previously described, the normal position of the shaft is as shown in Fig. 12, in which contact of the leading edge 52a (Fig. 12—C) of the lowermost arm 52 against the associated cocking lever limits counterclockwise rotation. However, as soon as the lowermost cocking lever is released in the manner previously described, it moves to the left away from the arm 52, permitting the shaft 35 to be rotated in counterclockwise direction by the spring 64. This rotation continues until the leading edge 51a of the arm 51 contacts the face 61 (Fig. 13) on its associated cocking lever 12, stopping the shaft 35 with the arm 51 positioned below the end of the associated locking pawl ready to release it and thereby permit the shaft 7 to be moved into bomb-releasing position by its associated spring 14 in response to the next upward movement of the shaft 35. Immediately following release of the cocking lever 12 associated with the arm 51, the shaft 35 is again free to rotate in counterclockwise direction in response to torque applied thereto by the spring 64 until the leading edge 50a of the uppermost arm 50 contacts the vertical face 61 on the uppermost cocking lever 12.

It will be apparent that in response to a third upward movement of shaft 35 the arm 50 will be elevated to release the uppermost locking pawl 17 to permit retraction of the uppermost cocking lever 12 by the associated spring 14 and movement of the uppermost control shaft 6 into bomb-releasing position.

It will be apparent from the foregoing description that the three control shafts 8, 7 and 6 may be successively released at any desired time intervals simply in response to successive upward movements of shaft 35, but that it is impossible to release the shafts in the inverse order, since the arm 51 cannot move into operative relation with its associated locking pawl until the lowermost shaft 8 has been released, and the upper arm 50 cannot move into position below its associated locking pawl until after the shaft 7 has been released.

To reset the mechanism, the lock bar 23 (Fig. 13) is set into intermediate or "selective" position and the shaft 35 is forcibly rotated in clockwise direction, by means of the handwheel 35a, (Fig. 12) against the torque exerted by the spring 64 into the normal position shown in Fig. 12, and is then retained in this position by cocking the lowermost cocking lever associated with the shaft 8. This cocking operation is performed by simply forcibly moving the tie rod 10 to the right against the force of spring 14 until the locking pawl engages and holds the cocking lever. In this position the face 61 on the lowermost cocking lever 12 engages the leading edge 52a of the arm 52 and holds the shaft 35 in position for release of the lowermost locking pawl. The upper shafts 6 and 7 are then reset, by cocking their associated cocking levers.

After the shafts 6, 7 and 8 and their associated tie rods and cocking levers have been reset as described, they may be positively locked against release by moving the lock bar 23 into lowermost position, in which the upper ends of the slots 24, 25 and 26 engage the pins 27 in the locking pawls. With the mechanism so locked in position, the bomb shackles under the control of the shafts 6, 7 and 8 may be safely loaded without any danger of accidental release of a bomb, which might possibly result if the shafts 6, 7 and 8 were not positively locked against release.

The operation of the mechanism has been described assuming that all of the control shafts 6, 7 and 8 would be used. However, it is to be understood that it is not necessary to employ all three shafts in order to utilize the advantages of the invention. Thus, if desired, only two of the three shafts 6, 7 and 8 can be used while still realizing the full advantages of the invention. If only the two upper shafts 6 and 7 are employed, then the lower shaft 8 is not reset and the shaft 35 is set into position in which the leading edge 51a on the arm 51 bears against the cocking lever 12 associated with the shaft 7. With this arrangement, the first upward movement of shaft 35 will release the shaft 7 and the second movement will release the shaft 6.

Also, if desired, only the upper shaft 6 and the lower shaft 8 may be employed, under which condition the shaft 7 will not be reset but will remain in released position, in which the associated cocking lever 12 is out of the path of the arm 51. With this setting, initial upward movement of shaft 35 will release the lowermost shaft 8 in the manner previously described and thereafter the shaft 35 will rotate through two steps (the rotation being unimpeded by the cocking lever associated with the shaft 7), and will stop with the upper arm 50 bearing against its associated cocking lever so that second movement of the shaft 35 will result in release of the upper shaft 6.

It should also be understood that it is not necessary to release all of the mechanisms. If desired, only one or two of the shafts 6, 7 and 8 may be released in the manner described, and the unreleased shaft thereafter may be positively locked against any accidental release by movement of the locking bar 23 into lowermost, or locking, position.

Obviously, any suitable means may be employed for lifting the shaft 35. Thus a mechanical linkage extending from the shaft to the cockpit might be provided, or an electrical solenoid might be coupled directly to the shaft and the solenoid energized through a switch in the control compartment.

However, it is desirable to be able to release the bombs on both the right and left sides of the rack in response to actuation of a single control element (the switch 111 in Fig. 1) in the control compartment. It is also desirable to drop bombs alternately from the right and left sides of the rack instead of consecutively from one side and then the other because lower bombs on one side may interfere with the fall of higher bombs on the opposite side. Therefore, a mechanism for alternately lifting the shafts 35 on the two sides of the bomb rack in response to successive energization of a single solenoid will now be described.

The single solenoid referred to is positioned in the bomb compartment 101 (Fig. 1), adapted to be successively energized by closing the switch 111 in the control department of the airplane.

Referring to Figs. 9 and 10 it will be observed that each of the shafts 35 has rigidly attached thereto adjacent its upper end, a disc 190 having spaced slots 191 in its periphery. Furthermore, there is positioned adjacent each of the discs 190 a bellcrank lever 192 having a lower arm, the end of which is normally positioned below the edge of its associated disc 190. Each lever 192 has an upper arm to which is connected the outer end of one of a pair of horizontal links 193. The inner ends of these links 193 (Fig. 9) are pivotally connected to opposite ends of a lever 194 which lever has an arm 195 connected by a link 196 to the plunger 197 of a solenoid 198. This solenoid is connected to the conductor 134 shown in Fig. 1, so that it is energized in response to closure of switch 111.

It will be observed from Figs. 9 and 10 that whenever the solenoid plunger 197 is retracted by energization of the solenoid 198 the links 193 are drawn inwardly toward each other, thereby raising the horizontal arm of the two bellcrank levers 192 simultaneously. If these arms are aligned with the slots 191 in the discs 190, then when they are raised they will pass through the slots and will not lift the shaft 35. On the other hand, if the discs 190 are so oriented that unslotted portions of the disc overlie the horizontal arms of the bellcrank levers 192, then when the solenoid 198 is energized the discs 190 will be lifted, thereby lifting the shafts 35.

In practice, since it is desired that the shafts 35 be lifted alternately in response to successive energization of the solenoid 198, apparatus is provided for causing the shafts 35 and the discs 190 thereon to turn in unison and out of phase with each other so that when a slot 191 in one of the discs 190 is aligned with the arm of the associated bellcrank lever 192, a solid portion of the other disc 190 will be positioned above the arm of its associated bellcrank lever. This synchronous rotation of the two shafts 35 in desired phase relation with each other, is maintained by rotatably intercoupling them through an overhead cross shaft 200 which is connected at its opposite ends to bevel gears, which bevel gears mesh with bevel gears coupled to the two shafts 35. The bevel gear associated with one of the shafts 35 is shown at 201 in Figs. 10, 12 and 13. They are shown dotted in Fig. 10 because they are enclosed in casings 202. Each of the gears 201 is mounted on the upper end of a short shaft 203 which is splined and extends into a splined recess in a hub 204 attached to and extending upwardly from each of the discs 190. This splined connection permits vertical movement of the discs 190 and the shaft 35 connected thereto without corresponding vertical movement of the gear cases 202 and the gears therewithin, and the cross shaft 200.

As previously described with reference to Figs. 12, 12—A, 12—B and 12—C and 15, one of the shafts 35 after being elevated to release one of the lock pawls was rotated by the spring 64 a sufficient distance to bring another of the arms 50 or 51 into operative position with its associated lock pawl 17. However, when the single solenoid 198 is employed for controlling both sides of the rack, and the two shafts 35 are permanently intercoupled with each other in out of phase relation, then following elevation of one of the shafts 35 the shaft does not rotate through the full angular distance necessary to bring the next arm 50 or 51 on that shaft into operative relation with its associated locking pawl. Instead, both shafts rotate through one-half this distance because such rotation brings one of the arms 50, 51 or 52 on the other shaft 35 into operative relation with its associated locking pawl.

It will be obvious that with the parts arranged and dimensioned as stated, following each energization of the solenoid 198 the shafts 35 on the right and left sides of the frame, respectively, will be rotated through half the angular distance between successive arms 50, 51, 52 thereon.

Referring to Fig. 9, with the parts in the position shown, upon energization of the solenoid 198, the bellcrank lever 192 on the right side of the drawing will engage and lift its associated disc 190, whereas the bellcrank lever 192 on the right side of the drawing will engage and lift its associated disc 190, whereas the bellcrank lever 192 on the left side of the drawing will ride through one of the slots 191 in its associated disc 190. However, following release of the solenoid 198, both of the discs 190 will be rotated through half the angular spacing between successive slots 191, which will bring a slot in the disc 190 on the right side of the drawing into alignment with its associated bellcrank lever 192 but will bring a solid portion of the disc 190 on the left side of the drawing into alignment with its associated lever 192. Hence in response to the second energization of the solenoid 198 only the disc 190 on the left side of the drawing will be lifted, and on the third energization of the solenoid only the disc 190 on the right side of the drawing will be lifted.

Should any of the bomb shackles on either side of the bomb rack not be loaded, then the two shafts 35 will continue to rotate until one of them is stopped by contact of one of its arms 50, 51 or 52 with its associated cocking lever which is in locked position and the next energization of the solenoid 198 will release that cocking lever.

Of course it is to be understood that although a system has been described with reference to Fig. 12 in which each shaft 35 actuates three bomb-release shafts 6, 7 and 8, that this number may be increased or decreased according to the number of bombs that need be carried.

The control system described has the great advantage that it is relatively safe, it being impossible to release a bomb when the release control is in the locked position. It permits "Salvo" firing when desired by suitable manipulation of the single control lever, and it permits release of all of the bombs on both sides of the rack one at a time at any intervals in response to successive closure of a single electric switch in the energization circuit of a single solenoid.

Obviously, if it is desired to eliminate electrical control, mechanical connection can be extended from the lever 194 (Fig. 9) to a suitable control lever in the control compartment of the airplane.

*Fragmentation bomb-release mechanism*

As previously mentioned with reference to Fig. 1, the system disclosed provides for two bays of fragmentation bomb racks, one rack 102 being positioned forward of the demolition bomb rack 101 and the other rack 103 being positioned aft of the demolition bomb rack 101. It was also explained that these two racks are under the control of a release rod 125 which extends to both of them and an arming rod 128 which likewise extends to both racks, and a single electrical circuit 134 which is connectible to either rack by a switch 135. This switch 135 normally connects the line 134 to the rear rack 103 and is automatically actuated, in a manner to be described, to shift control to the front rack 102 when the rear rack has been emptied. The two racks 102 and 103 are identical except for the provision of means for actuating the switch 135 on rack 103. Each rack is adapted to support 20 bombs arranged in four rows extending transversely of the airplane, with five bombs in each row.

Referring to Fig. 31, the rack comprises separate units 300, 301, 302 and 303 for supporting each row of five bombs. The four units are positioned on the same level with each other, and extend transversely of the airplane and spaced fore and aft from each other a sufficient distance to provide ample room for the bombs suspended therefrom.

Each of these units 300 to 303, inclusive, has a supporting frame consisting of two vertically disposed and horizontally spaced frame plates 304 and 305, respectively (Fig. 33) which plates are bent outwardly at their upper edges to form stiffening flanges 306 and 307 respectively. The plates are also bent out at their ends to form flanges 308 and 309, respectively, which flanges are secured to horizontal supporting frame members 310 and 311, respectively, the latter being attached to the frame of the aircraft. As shown to best advantage in Fig. 33, the two plates 304 and 305 are held together by bolts 312 (Figs. 33 and 32) and kept properly spaced apart by spacer tubes 313 which surround the bolts between the plates 304 and 305. A substantial portion of the bomb-supporting mechanism is positioned between these frame plates 304 and 305.

Referring to Fig. 32, the plates 304 and 305 have extending upwardly from their lower edges a plurality of bomb slots 315, five in number, and a plurality of arming ring slots 316, one adjacent each bomb slot 315. Mounted adjacent each bomb slot 315 is a supporting hook 317 mounted on a pivot pin 318 extending between the plates 304 and 305. Each hook is adapted to rotate counterclockwise from the position shown in Fig. 32, in which the hook bridges the lower end of the slot 315, into a position where the hook clears the slot 315, and a shoulder 340 on the hook projects down into the slot 315, as shown in Fig. 34. Each bomb has a ring in its tail, which ring is normally supported on one of the hooks 317. When the hook is moved counterclockwise into position clear of the slot 315 (release position) the bomb is of course dropped.

Each hook 317 is constantly urged toward release position by a tension spring 319 but is normally restrained from moving into such position by a release lever 320, the lower end of which bears against a shoulder 321 on the hook 317. Each lever 320 is constantly urged into locking position, as shown in Fig. 32 by a tension spring 322.

The levers 320 are under the control of a release bar 370 (Figs. 32 and 33); and of arms 323, 324, 325, 326 and 327, respectively, all mounted on a shaft 328, which is supported in bearings 329 for rotary and longitudinal movement. The release bar 370 is supported for longitudinal sliding movement on the wall 304 by bolts 371 which extend through longitudinal slots 372 in the bar 370. At its right end (Fig. 32) the release bar 370 has secured thereto an eye 373 which eye is connected by a pin 374 (Fig. 34) to a crank 375 on a shaft 376, which shaft (Fig. 31) extends past the ends of all of the units 300, 301, 302 and 303, and is supported for rotation by brackets 377. This shaft 376 has at its upper end (with reference to Fig. 31), an arm 378 which in turn is connected through a link 379 and a bellcrank lever, not shown, to the control rod 125 (Fig. 1), which extends to the release control mechanism 113 in the control compartment of the airplane. Of course the shaft 376 is similarly connected to all of the control bars 370 in all of the units 300, 301, 302 and 303, respectively, so that movement of the release control mechanism 113 (Fig. 1) simultaneously actuates all of the control bars 370 (Fig. 32) in all of the units of the fragmentation bomb racks. When the control lever 124 (Fig. 1) is in locked position, the control bars 370 (Fig. 32) occupy extreme right-hand positions. When the control lever 124 is in "Sel" position, the bars 370 occupy intermediate positions (as shown in Fig. 32 the bar is in intermediate), and when the control lever 124 is in "Salvo" position, the bars 370 are moved into leftmost position.

Each of the levers 320 (Fig. 32) is provided with a pin 380 which projects through a slot in the wall 304 and a slot 381 in the bar 370. These slots 381 are so positioned and dimensioned that when the bar 370 is in extreme right position (corresponding to "Lock" position of the release control mechanism), the left end of the slot 381 engages the pins 380 of the levers 320 and positively prevents any rotation of these levers in counterclockwise direction to release the hooks 317. When the lock bar 370 is in intermediate position, as shown in Fig. 32, the levers 320 are free to move in counterclockwise direction in response to actuation of the shaft 328, as will be described later. When the bar 370 is moved into extreme left position, corresponding to "Salvo" position of the release control mechanism, the right ends of the slots 381 engage the pins 380 of all the levers 320 and rotate them in counterclockwise direction, to release all of the hooks 317.

The different pins 380 are non-uniformly spaced relative to the spacings between the right ends of the slots 381 so that when the release mechanism is moved into "Salvo" position the bombs in each row are not released exactly simultaneously but drop in rapid succession.

In the normal longitudinal position of the shaft 328 the various arms 323 to 327, inclusive, thereon are juxtaposed to shoulders 330 on the upper ends of the different levers 320 and one of these arms 323 lies against the shoulder 330 on its associated lever, restraining the shaft 328 against rotation in such a direction as to bring one of the other arms 324, 325, 326 or 327 against its associated shoulder 330. However, the shaft 328 is constantly urged to rotate in such a direction as to carry the arms toward the levers 320 by a torsion spring 331, the left end of which is connected to the shaft 328 through a coupling member 332. The right end of the spring 331 is anchored to a flange 333 on a sleeve 334 which surrounds the right end of shaft 328 and connects to a shaft 341 rotatably supported in a bearing 342.

The shaft 328 is adapted to be moved longitudinally to the left by mechanism to be described later, such movement causing that one of the arms 323, 324, 325, 326 or 327, which is in contact with its associated lever 320, to carry the upper end of that lever to the left, thereby causing release of the lower end of the lever from the shoulder 321 on the associated hook 317, whereupon the hook is rotated in counterclockwise direction by its associated spring 319 to release the bomb. Rotation of the hook member in response to the force of the spring 319 is limited by contact of a shoulder 343 thereon with the lower end of lever 320. The peripheral face 344 of the hook 317 adjacent the shoulder 343 is spaced radially from the axis of rotation of the hook a distance such that lever 320 is prevented from following its associated arm 323, 324, 325, 326 or 327 all the way back, so that the shoulder 330 on arm 320 is held clear of its associated arm, permitting the shaft 328 to be rotated by the spring 331 until the next arm is engaged by its associated lever 320. Thus, following actuation of the leftmost lever 320 (Fig. 32) to disengage the shoulder 321 on its hook 317, the lever 320 is restrained from returning to its former position, thereby releasing the arm 323 just as the arm 327 is shown clear of its associated lever 320 in Fig. 34. Thereupon the shaft 328 is rotated by the spring 331 until the arm 324 engages the shoulder 330 on the next lever 320 to the right. This operation is repeated in response to each reciprocation of the shaft 328 so that the five bombs are released successively from left to right.

It will be observed from Fig. 32 that on its leftmost end shaft 328 carries a substantially semi-cylindrical hub 345 having a peripheral groove 346 therein.

Referring now to Fig. 31, when all of the four rows 300 to 303, inclusive, of the rack are loaded with bombs, the groove 346 in the hub 345 of the first lowermost rack 300 is engaged by a pin 347 mounted on an arm 348 on a shaft 349 which extends transversely across the four racks 300, 301, 302 and 303. The shaft 349 is supported for rotary and longitudinal movement; is constantly urged longitudinally (upwardly with reference to the view of Fig. 31) by a helical spring 350 which surrounds the shaft, and is compressed between a collar on the shaft and the frame member. This shaft 349 has a downwardly extending arm 351 (Fig. 37) provided with a crankpin 352 which is engaged by a slot 353 in a head on the end of a plunger 354 of a solenoid, 355. This solenoid is adapted to be energized over the conductor 136 shown in Fig. 1. Each time the solenoid is energized it rotates the shafts 349 in a counterclockwise direction, and when the solenoid is de-energized the shaft 349 is rotated back in a clockwise direction to its original position by the restoring spring 357.

Referring now to Fig. 31, the first five operations of the solenoid 355 result in successive reciprocations of the shaft 328 associated with the unit 300, which successively releases the five bombs suspended in that rack from left to right, respectively. Furthermore, the release of the first arm 323 permits the shaft 328 to rotate through substantially 30° until the arm 324 contacts its associated shoulder 330. Following the second impulse of the solenoid, the arm 324 is cleared from its associated lever 320, permitting the shaft to again rotate through 30° to bring the arm 325 into operative relation with its associated lever 320. Therefore by the time the arm 326 has been released the shaft 328 has been rotated through 120°, and following the release of the last arm 327 shaft 328 is rotated by the spring 331 through approximately 180°, being stopped by contact of a finger 360 (Fig. 36) with a shoulder 361 on a semi-cylindrical sleeve 362 (Fig. 35).

This rotation of the shaft 328 of the first row 300 carries the semicylindrical hub 345 clear of the longitudinal path of movement of the pin 347, since the pin 347 is positioned below the level of the center of the hub 345. Thereupon the spring 350 urges the shaft 349 longitudinally (the direction being taken with reference to Fig. 31) until a second pin 347 engages a groove 346 on a semicylindrical hub 345 on the shaft 328 in the second row 301. Thereupon the next five movements of the plunger of the solenoid 355 will reciprocate the shaft 328 in the second row 301 to successively release the five bombs in that row, exactly the same as the bombs were released in the row 300. Following release of the last bomb in the row 301, the semicylindrical hub 345 in that row is carried clear of its associated pin 347 whereupon the spring 350 again shifts the shaft longitudinally to bring another pin 347 thereon into operative relation with another hub 345 in the row 302. Thereafter successive energization of the solenoid 355 discharges the bombs in the row 302, and after the last bomb is released, the hub 345 is carried out of registration with its associated pin 347, permitting the shaft 349 to again be moved by spring 350 to bring a fourth pin 347 thereon into registration with a fourth hub 345 in the fourth row 303 of the bomb rack, so that succeeding movements of the solenoid 355 function to release the bombs in this last row.

Following the release of all the bombs, all of the levers 320 (Fig. 34) have been rotated into a counterclockwise or release position with their shoulders 340 projecting into the slots 315 and the shafts 328 are rotated by their associated springs 331 through slightly less than 180° to carry the fingers 360 thereon against the shoulders 361 of sleeves 362 (Figs. 35 and 36). To reload and reset the racks, the release mechanism 113 (Fig. 1) is set into "Sel" position, which positions the bars 370 (Fig. 32) in intermediate position. Thereafter the bombs are loaded by pressing the suspension rings thereof up into the slots 315 against the shoulders 340 on the hooks 317, which rotate the hooks into the normal position shown in Fig. 32. As each hook is rotated into supporting position, its associated lever 320 is snapped by its spring 322 into locking position, with its lower end against the shoulder 321 on the hook, so that the bomb will be supported by the hook. After all of the bombs have been loaded in this manner, the release mechanism 113 (Fig. 1) is moved into "Lock" position, thereby moving the bars 370 to the right and positively locking the levers 320 against release. Thereafter the shafts 328 are reset. This is accomplished by rotating the shaft 341 through substantially 360° in a clockwise direction (the direction being taken with reference to Fig. 32). To facilitate this rotation, there is provided on each shaft 341 a drum 390 about which a cable 391 is wound at least one complete turn, and the end of the cable carried down through a hole in a stop member 392 on the frame and attached to a pull ring 393.

Pulling the ring 393 unwinds the cable 391 from the drum 390, rotating the latter in clockwise direction. Of course the sleeve 362, being attached to the shaft 341 and the drum 390, rotates therewith. Initial rotation of the sleeve 334 through slightly less than 180° serves to tension the spring 331. Thereafter the shoulder 394 (Fig. 36) on the sleeve 362 engages the finger 360 on the shaft 328 and the final rotation rotates the shaft 328 to bring the arm 232 thereon against the stop 330 on the leftmost lever 320 (Fig. 32). The sleeve 362 is restrained against reverse rotation by spring detent 395 which engages a notch 396 (Figs. 35 and 36) in the flange 333.

Following release of the pull ring 393 the drum 390 is rotated in the reverse direction to rewind the cable 391 by a helical spring 397 which is tensioned by the clockwise rotation of the drum 390. This reverse rotation of the drum 390 in response to force of the spring 397 is possible by virtue of a ratchet connection between the drum 390 and the shaft 341.

After the rack has been loaded and locked in the manner described, it is ready for operation either for "Salvo" release of all of the bombs substantially simultaneously in response to movement of the release mechanism into "Salvo" position, or for release of the bombs one at a time by moving the release mechanism into "Sel" position, and thereafter energizing the solenoid 355 by closure of the switch 114 (Fig. 1).

As shown in Fig. 1, closure of the switch 114 energizes the solenoid in the rear bay 103 by virtue of the fact that switch 135 connects conductor 134 to conductor 136. This is the normal setting so that bombs are initially released from the rear bay 103. A mechanism is provided for automatically actuating this switch 135 to complete the circuit to the front bay 102 following release of the last bomb from the rear bay 103.

Thus referring to Fig. 38, the switch 135 is indicated as a box having a switch handle 398 projecting from the lower end thereof into a slot 399 (Fig. 38) in the shaft 349. Following release of the last bomb in the last row 303 (Fig. 31) of the rack in the rear bay 103, the semicylindrical hub 345 in the last row 303 is rotated out of the path of its associated pin 347, permitting a final movement to be imparted to the shaft 349 by the spring 350. This final movement, which is to the left with reference to Fig. 38, causes the ends of the slot 399 in shaft 349 to engage the handle 398 of the switch 135 and shift it to the left. This causes the mechanism of the switch 135 to break the circuit (Fig. 1) between conductors 134 and 136 and complete the circuit between conductors 134 and 137. Thereafter further closure of the switch 114 energizes the solenoid in the forward bay 102 to successively release the bombs in that bay.

Obviously as many bays may be employed as are desired and the control transferred successively from each bay to another, as all the bombs in each bay are released.

In the description of operation it has been assumed that the bomb racks were loaded to capacity. It will be understood, however, that if any bomb stations are left empty, then during selective fire the empty stations will be jumped, just as they are in the demolition bomb rack, so that a bomb will be dropped in response to each actuation of switch 114 as long as there is a bomb anywhere in the racks.

Heretofore in describing the fragmentation bomb rack no mention has been made of the mechanism for "safing" or "arming" the bombs except to refer to the arming slots 316, of which there is one adjacent each bomb slot 315. Each fragmentation bomb has an arming wire associated therewith, which arming wire terminates in a ring, which ring is pressed into the slot 316 associated with the slot 315 into which the bomb-supporting ring is placed. The construction of the bombs is such that if the arming ring is only loosely retained in the slot 316, it will be pulled away when the bomb drops and will remain on the bomb. Under such conditions, the bomb will not explode. On the other hand, if the arming ring is positively retained in the slot 316 when the bomb is dropped, then the arming wire connected to the arming ring is pulled loose from the bomb and in so doing it conditions the bomb so that it will explode when it hits.

The arming ring is yieldably retained within the slot 316 by a clip 400 which constitutes one arm of a bellcrank lever 401 positioned between the frame plates 304 and 305 rotatably mounted on a pivot pin 402. The clip 400 is constantly urged into position to close the slot 316 by a tension spring 403. This tension spring will, however, permit retraction of the clip 400 in response to a pull on the arming ring, so that the latter will pull out when the bomb is released if only the spring 403 is functioning to restrain rotation of the bellcrank lever 401. In order to selectively, positively lock the clips 400 against release, each bellcrank lever 401 has a pin 404 thereon, which projects through an opening provided therefor in the wall plate 305 and into a slot 406 (Figs. 32-33) in an arming bar 407 which is slidably supported for longitudinal movement against the wall 305 by bolts 408 exactly the same as the release bar 370 is supported for sliding movement along the wall 304. Of course the arming bar 407 has a slot 406 for each of the pins 404 on the different bellcrank levers 401. All of the slots are identical. These slots are roughly triangular in shape, being narrow vertically, with reference to Fig. 32, at their left ends, and wider at their right ends. As shown in Fig. 32, the arming bar 407 is in "safe" position, in which the wide ends of the slots 406 are juxtaposed to the pins 404, so that the pins are free to move downwardly and only the springs 403 maintain the clips 400 in closed position. However, if the arming bar 407 is moved to the right, then the narrow ends of the slots 406 are adjacent the pins 404 and the latter are positively restrained against downward movement, thereby preventing any rotation of the bellcrank levers 401 and positively preventing movement of the clips 400 to release the arming ring.

All of the arming bars 407 in the different units of each rack, are connected at their right ends (Fig. 32) to eyes 410 which eyes are connected by pins 411 (Fig. 34) to crankarms 412 on a shaft 413 which extends immediately below and parallel to the shaft 376 previously described. This shaft 413 is connected by suitable linkage 415 (Fig. 31) and the bellcrank levers (not shown) to the arming rods 128 of Fig. 1, so that they are controlled by the arming mechanism 112 in the control compartment.

Emergency release mechanism

The mechanism so far described permits complete control of both the demolition and fragmentation bomb racks from control stations on the airplane. The bombardier is of course skilled in the operation of the controls and can very quickly, if necessary, discharge all of the bombs in safe condition in an emergency by manipulating the regular controls in the manner already fully described.

However it sometimes happens, either as a result of injury to the bombardier or damage to the intercommunicating system of the craft, that the control of the bombs by the usual controls is lost. I therefore provide an emergency release mechanism for both the demolition bomb rack and the fragmentation bomb rack, which will automatically release all the bombs in safe condition in response to actuation of a single control element, which element may be duplicated in various parts of the ship so that any member of the crew can actuate it.

As shown in Fig. 1, this emergency release mechanism includes a pull cord 125 which extends to various points in the ship and is connected to the lever 124 of the demolition bomb emergency release mechanisms 123 and through a cord 130 to the fragmentation bomb emergency release mechanism 126. These emergency release mechanisms 123 and 126 are substantially identical except for the provision in the demolition bomb mechanism 123 of additional controls for opening the doors below the demolition bomb racks. In other words, mechanism 123 must, in response to actuation of its lever 124, first shorten the door control rod 120 to open the doors 106, then shorten the arming rod 122 to "safe" the bombs, and, only after the foregoing operations have been completed, shorten the release rod 118 to pull the release bars in the demolition bomb rack into "Salvo" release position. On the other hand, the mechanism 126 has only two functions to perform in response to actuation of the lever 129, the first function being to shorten the arming rod 128 to "safe" the bombs, and then shorten the release rod 125 to shift the release bars in the fragmentation bomb rack into "Salvo" releasing position.

The emergency release mechanism 123 for the demolition rack will now be described with reference to Figs. 21 to 32, respectively.

Figure 22:
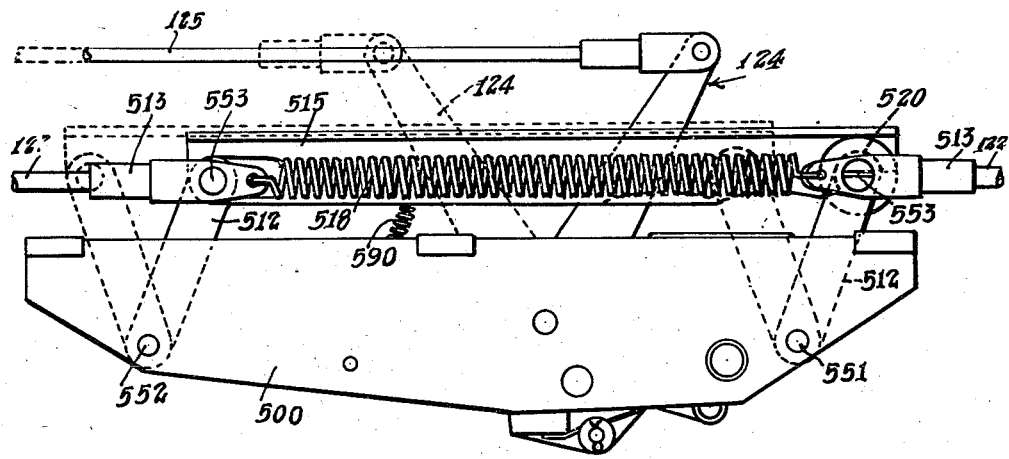
Fig. 22 is a side elevational view of the same mechanism.

Referring first to Figs. 21 and 22, the emergency release mechanism comprises a frame consisting of side plates 500 and 501 (Fig. 26) interconnected by an integral wall 550 at the top (Fig. 39), this frame functioning to support all of the movable elements of the mechanism. Extending between the frame plates 500 and 501 adjacent the forward and rearward ends thereof, are a pair of shafts 551 and 552, respectively, on which there are pivotally mounted a plurality of arms 512, the upper ends of the arms being connected to the various control rods 118, 120 and 122, respectively, going from the bombardier's control compartment to the various elements to be controlled. Thus each arm 512 is connected by a pivot bolt 553 to a connector 513 which connects to the ends of the various rods 118, 120 and 122. Each pair of connectors 513 associated with the same control rod, are interconnected by powerful tension springs 518, there being one pair of springs 518 between each pair of connectors 513, as shown in Fig. 21. To normally maintain the arms 512 associated with each control rod in spaced parallel position, a plurality of struts 515 are provided, these struts being of T-cross section and relatively rigid, with the front end of each strut pivotally mounted on the pivot bolt 553 at the forward end of the unit and the rear end having a notch 520 which normally engages the pivot bolt 553 at the opposite end. Obviously so long as the struts 515 are in engagement with the pivot bolts 553 at opposite ends of the unit, the associated springs 518 can not displace the associated pair of connectors 513 toward each other. Therefore, in effect, the interrupted ends of each of the rods 118, 120 and 122 are interconnected together so that movement of the forward ends of the rods occasioned by movement of the control in the control compartment, is simply transmitted through the emergency release unit to the rear portions of the rods, and hence to the bomb rack.

As shown in Fig. 21, all of the rods 118, 120 and 122 are in their rearmost positions in which the release rod 118 is in locked position and the door control rod 120 is in door-closing position and the arming rod 122 is in armed position. With the rods in the rearmost positions, the arms 512 (Fig. 22) are inclined rearwardly at an angle from the vertical. When the rods are moved to their forward positions the arms 512 swing forwardly through a small arc, as indicated by the dotted line showing in Fig. 22.

In an emergency release of the bombs, it is desired to first move the arming rod 122 and the door-rod 120 forwardly to "safe" the bombs and open the doors. Thereafter the release rod 118 is to be moved forwardly to release the bombs in "Salvo." Obviously these operations can be performed by displacing the struts 515 to disengage their notches 520 (Fig. 22) from the connectors 513, whereupon the springs 518 are free to contract and move the rear portions of the rods 118, 120 and 122 forwardly. The mechanism of the emergency release is such that when the handle 124 is moved (by pulling the cord 125) from the full line position shown in Fig. 22 into the dotted line position shown in that figure, the struts 515 associated with the arming rod 122 and the door rod 120 are simultaneously released, after which the strut 515, associated with the release control rod 118 is released, thereby insuring that the doors will be open and the bombs "safed" before the release control is operated to drop the bombs in "Salvo."

Figure 23:
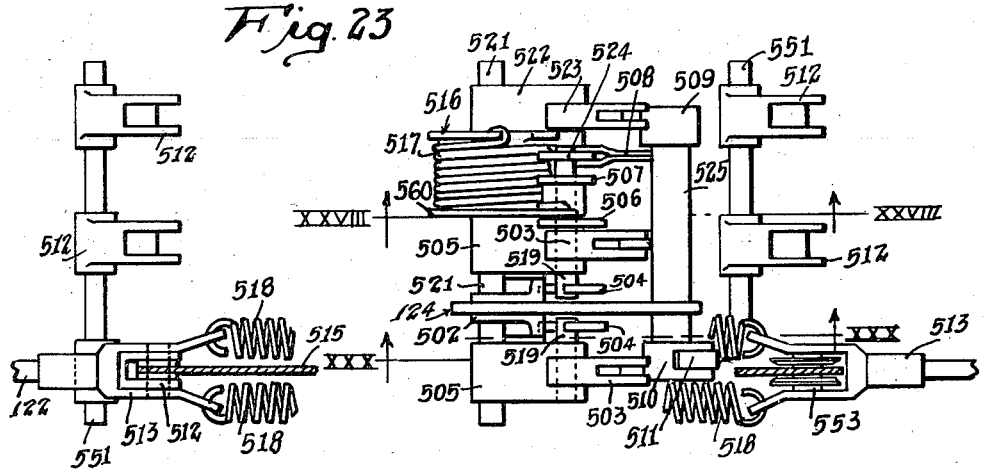
Fig. 23 is a broken plan view of the same mechanism to better illustrate some of the interior details thereof.
Figure 24:
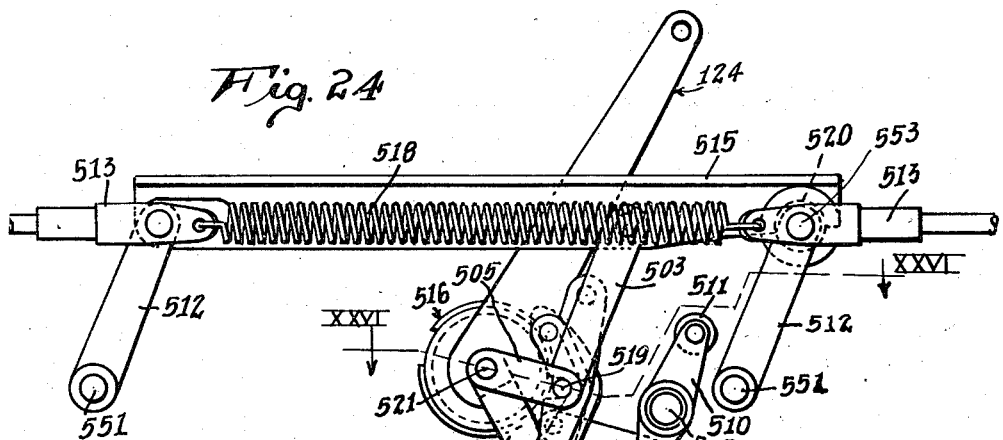
Fig. 24 is a skeleton view in elevation of certain elements of the emergency release mechanism.
Figure 25:
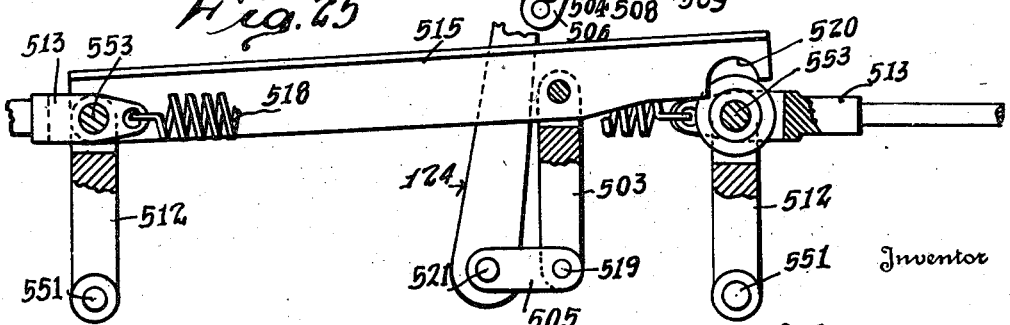
Fig. 25 is a skeleton view of certain parts of the emergency release mechanism in general similar to Fig. 24, but showing certain of the parts in different positions.
Figure 26:
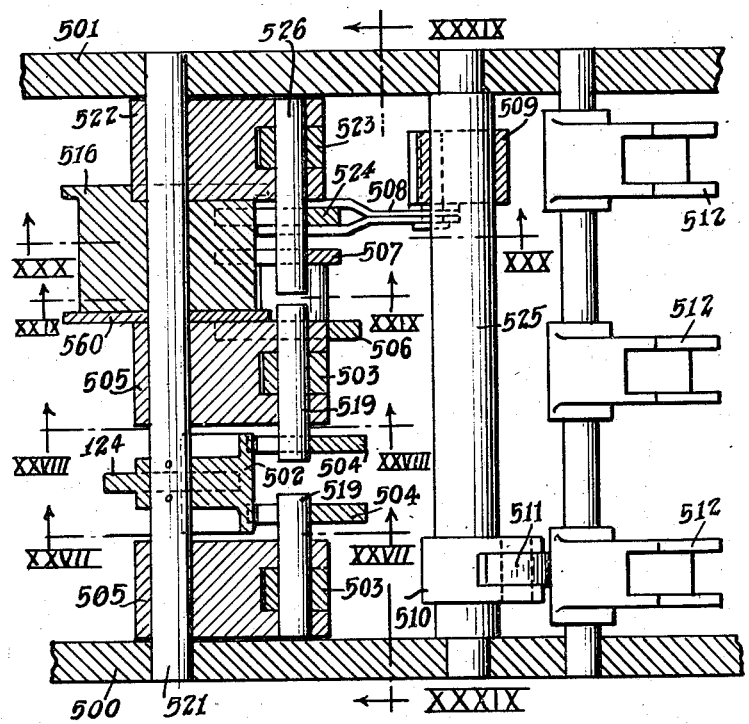
Fig. 26 is a plan sectional view of the emergency release mechanism shown in Fig. 23, the section being taken on line XXVI—XXVI of Fig. 24.
Figure 27:
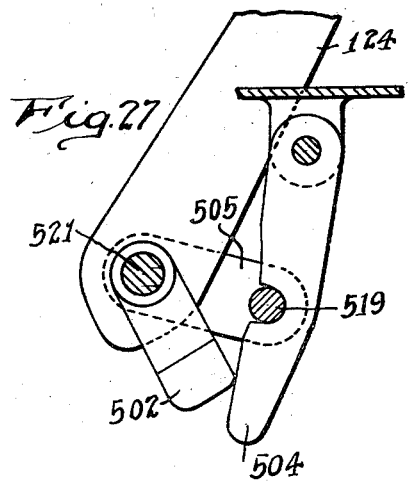
Figure 28:
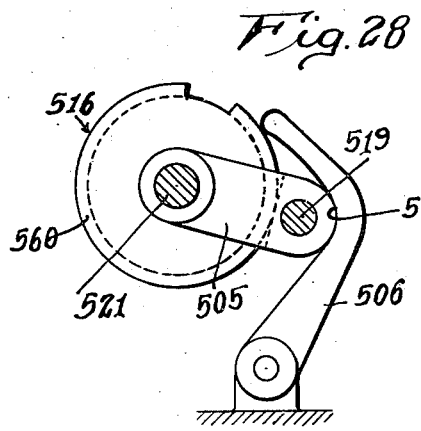

Referring now to Figs. 23 and 24, the operating lever 124 is connected to a shaft 521 pivotally mounted in the frame side members 500 and 501. Also rigidly mounted to the shaft 521 for rotation therewith is a cam 502 and rotation of the shaft 521 in response to forward movement of the lever 124 causes cam 502 to bear against a pair of pawls 504 which are pivotally supported at their upper ends from the frame. Each of these pawls 504 has a recess therein, and these recesses normally receive a pair of pins 519 (Figs. 23 and 24), which pins project laterally from a pair of arms 505 which are rotatably mounted on the shaft 521. So long as the pins 519 are retained in the recesses in the pawls 504, the arms 505 are positively restrained against rotation.

This is important because arms 505 are also connected (by the same pins 519) to the lower ends of links 503, the upper ends of which links are pivotally connected to the two struts 515 associated with the arming rod 122 and the door control rod 120, respectively. Hence so long as the pins 519 are engaged by the recesses in pawls 504 the struts 515 are positively locked in the normal position shown in Figs. 22 and 24.

However, rotary movement of the cam 502 in response to forward movement of the lever 124 causes this cam to move against the pawls 504 and swing their lower ends to the right out of engagement with the pins 519, thereby releasing the latter for upward movement. Continued motion of the cam 502 causes the latter to contact the pins 519, raising them and the arms 505 which in turn raise the links 503 which lift the struts 515 associated with the arming rod 122 and the door-control door 120, respectively. As soon as these struts are elevated sufficiently to carry the notches 520 in the right ends thereof clear of the bolts 553, the springs 518 associated with those struts, contract to displace the rear portions of the rods 120 and 122 forwardly, thereby throwing the arming mechanism in the bomb rack into "safe" position and shifting the hydraulic valve 1211 (Fig. 1) into position to open the doors below the demolition bomb compartment. However, the strut 515, associated with the release rod 118, does not release at the same time. This strut is connected through a link 523 (Fig. 26) to an arm 522 rotatably mounted upon the shaft 521.

In the normal position of the apparatus there is no force tending to lift this arm 522. Furthermore, the arm is locked against movement by a pawl 524 (Fig. 30) engaging a pin 526 projecting laterally from the arm 522, and also by a pawl 507 (Fig. 29) which likewise engages the pin 526 in the normal position of the apparatus.

The arm 522 is attached to a drum 516 rotatably mounted on the shaft 521, which drum 516 is engaged by one end of a torsion spring 517 wound on the drum 516 and having its opposite end connected to a disc 560 attached to the shaft 521. Therefore initial rotation of the shaft 521 in response to movement of the lever 124 to the left, tensions the spring 517, tending to rotate the drum 516 and lift the arm 522 and disengage the strut associated with the control rod 118. However immediate movement of the arm 522 in response to this spring force is prevented by the pawls 524 and 507 engaging the pin 526.

The pawl 507 is disengaged from pin 526 during the initial counterclockwise rotation of shaft 521 by the lever 124, by means of the following mechanism: Pawl 507 is connected to and moves with an arm 506 which has a cam face 506a (Fig. 28) resting against one of the arms 505 (Fig. 39). As this arm 505 rises in response to movement of the operating lever 124, as has been previously described, it forces the arm 506 to the right, carrying the pawl 507 also to the right and disengaging it from pin 526. Thereafter the only thing restraining the arm 522 from being moved upwardly by the spring 517 is the pawl 524 which is also in locking relation with the pin 526. This pawl 524 is released only following release of the strut 515 associated with the arming rod 122 and the consequent rotation of the associated arm 512 by the associated springs 518. Arm 512, in moving to the left, contacts the roller 511 on the upper end of an arm 510 fixed to a shaft 525 which is mounted for rotation and rotates the arm 510 and shaft 525 in counterclockwise direction. Also fixed to the shaft 525 adjacent the opposite end thereof is an arm 509 which is connected by a link 508 to the pawl 524. The rotation of the shaft 525 in counterclockwise direction shifts the arm 509 and the link 508 to disengage the pawl 524 from the pin 526, whereupon the spring 517 elevates the arm 522 and the link 523 to unseat the strut 515 in the release control rod 118 and permit the associated spring 518 to actuate that part of the rod 118 going to the bomb rack, and release the bombs.

It will be observed that the emergency release mechanism described provides two interlocks for preventing premature release of the bombs relative to the actuation of the arming and the door-control linkage. Thus the locking pawl 507 cannot be released until the operating lever 124 has rotated the shaft 521 sufficiently to release the struts 515 in the arming and door-control linkage and the locking pawl 524 cannot be released until after the arming control strut has been fully released and the arming control actuated by its associated springs 518.

It should be borne in mind that although the emergency release mechanism 123 (Fig. 1) permits actuation of the rear end of the release rod 118 as soon as the rear ends of the "safing" rod 122 and the door rod 120 have been actuated, rod 118 is still locked against releasing movement, by the pin 155 (Fig. 4) engaging the arm 158, until the doors are actually open. This is important because the doors may require an appreciable time to open, following actuation of the door control valve 1211 (Fig. 1).

It will be apparent that the emergency release mechanism actuates the rear section of the control rods 118, 120 and 122 without moving the front section of those rods and the control levers 117, 119 and 121 connected thereto. This has two important advantages. In the first place it eliminates any danger of injury to the bombardier such as might result from sudden and unexpected movement of his control levers. In the second place, it eliminates any possibility of interference by the bombardier with the emergency release, such as might result if the bombardier were dead or injured and his body had fallen onto the controls in such a way as to block their movement.

Following actuation of the emergency release mechanism it may be reset, following release of the emergency cord 125, by simply moving the release lever 117 into "salvo" position, the door lever 119 into "open" position, and the arming lever 121 into "safe" position. This shifts the struts 515 forwardly, bringing the notches 520 into registration with the rear pins 553 and permitting the struts to drop into normal position as shown in Fig. 22. Tension springs 590 may be provided to aid gravity in restoring the struts. After the struts have been restored as described, the levers 117, 119 and 121 may be moved into any desired position and the motion will be transmitted through the emergency release mechanism to the associated controlled devices.

The emergency release mechanism 126 (Fig.

1) associated with the control rods 125 and 128 for the fragmentation bomb racks, is identical with the emergency release mechanism 123 described, except that the door-control mechanism has been eliminated. It will be observed from the description of the mechanism 123 given, that the door-control mechanism merely consists of a duplication of the arm 505, the pin 519, the locking pawl 504 and the link 503 employed to release the strut 515 in the arming control rod. If desired, the unit 126 may be identical with the unit 123, the middle door control mechanism not being used.

For the purpose of explaining the invention a specific embodiment thereof has been described in detail. However, it is to be understood that many variations from the particular structure described and shown can be made without departing from the invention, and the invention is to be limited only as set forth in the appended claims.

I claim:

1. A device of the type described, comprising a plurality of bomb-control mechanisms movable between hold and release positions respectively, a master element rotatable through a plurality of selective positions and operatively associated with a different one of said mechanisms in each selected position, means for moving said master element axially, and means responsive to such axial movement for releasing the mechanism operatively associated therewith, and means responsive to release by said master element of one of said mechanisms for rotating the master element into operative relation with another of said mechanisms.

2. A device as described in claim 1, in which said master element comprises a plurality of arcuately displaced arms, each positioned adjacent one of said mechanisms and movable into and out of operative relation therewith in response to rotation of said element, release means in each mechanism responsive to axial movement of the associated arm while the latter is in operative relation therewith for releasing that mechanism, and means in each mechanism intercepting the associated arm and retaining it against rotary movement out of operative relation therewith while said mechanism is in hold position, said last mentioned means moving out of intercepting relation with said arm in response to release of said mechanism.

3. A device of the type described, comprising a plurality of bomb-control elements movable between holding and releasing positions, respectively, means for moving each element into releasing position, individual latching means for releasably locking each element in holding position, a member extending past all said latching means, and means supporting said member for longitudinal movement and movement in a lateral plane, said member having arms individual to each different latching means for releasing the latter in response to longitudinal movement of said member, said arms being displaceable into and out of releasing position with their associated latches in response to movement in a lateral plane of said member, and being so positioned laterally that each arm is in operative relation with its latch in a different lateral position of said member, means for yieldably moving said member in a lateral plane, means associated with each of said elements and movable thereby to block movement in a lateral plane of the associated arm out of operative relation therewith while said element is in holding position and releasing said arm when said element is in releasing position, and means for moving said member longitudinally.

4. Bomb control apparatus comprising a plurality of bomb racks, each adapted to contain a plurality of bombs, means in each rack for releasing the bombs in that rack successively, said means including an actuating member reciprocable between two positions and rotatable through a plurality of positions, and operatively associated with different bombs in different positions of rotation, means for releasing the bomb operatively associated with said member in response to reciprocation thereof, means for restraining said member against rotation out of operative relation with each bomb until release of that bomb, a single reciprocable control member, and means operable in response thereto for sequentially reciprocating the actuating members in the different respective bomb racks to drop bombs from the different racks, one at a time.

5. Bomb control apparatus comprising a plurality of bomb racks, each adapted to contain a plurality of bombs, means in each rack for releasing the bombs in that rack successively, said means including an actuating member rotatable through a plurality of positions and operatively associated with different bombs in different positions of rotation, said member also being reciprocable axially, means for releasing the bomb operatively associated with each actuating member in response to reciprocation thereof, means for restraining each actuating member against rotation out of operative association with each bomb until release of that bomb, each actuating member having a star wheel thereon, common reciprocable control means including actuating elements adjacent said respective star wheels, and means rotatably coupling said star wheels together for successive engagement by their associated actuating elements one at a time in response to successive actuation of said common reciprocable control means.

6. A device as described in claim 1, in which said means for rotating said master element comprises a torsion spring and an anchoring member rotatable coaxially with said master element, said torsion spring being connected between said master element and said anchoring member, and means for rotating said anchoring member to a predetermined angle and restraining it against reverse rotation.

7. In a bomb rack, a plurality of bomb-supporting units, each including a shaft and mechanism responsive thereto for successively releasing different bombs in response to reciprocation of the shaft, each shaft rotating through a predetermined angle in response to release of the bombs in the associated unit, each shaft having a segmental shoulder thereon, a master shaft extending transversely to the shafts in said units and having arms thereon adapted to engage the shoulders on the shafts in said different units, in different longitudinal positions of said master shaft, means for oscillating said master shaft to reciprocate the bomb control shaft, the shoulder of which is in operative relation therewith, each shoulder disengaging itself from said master shaft in response to rotation of its associated shaft through said predetermined angle, and means for moving said master shaft axially to engage the shoulder means on the shaft in the next unit, following disengagement of the shoulder in the preceding unit.

8. In a bomb rack, a plurality of bomb-supporting units, each unit supporting a plurality of bombs in a row and the units being arranged side by side, each unit including a bomb-control shaft rotatable and reciprocable, said shafts having segmental collars mounted thereon in transverse alignment with each other, a master shaft extending transversely to said rows adjacent said segmental collars and having a plurality of arms thereon spaced apart less than the distance between said rows, each arm being adapted to engage one of said segmental collars in normal position of rotation of the collar, and to clear the collar in another position of rotation, said master shaft being movable axially through different positions to engage the different arms thereon with their associated collars, one at a time, spring means urging said master shaft axially to engage one of said arms with one of said collars, means for oscillating said master shaft and the arms thereon to reciprocate the collars and shaft in the unit in operative relation therewith, said spring means shifting said master shaft axially to engage a different arm thereon with the collar in a different unit, in response to rotation of each collar out of registration with its associated arm.

9. Bomb control apparatus for movable craft, comprising means for releasably supporting a bomb, conditioning means for rendering said bomb safe or armed, first control means for actuating said supporting means to release said bomb, and second control means for actuating said conditioning means independently of said first control means, a third control means, and means responsive to operation thereof for sequentially first actuating said conditioning means to render the bomb safe and thereafter actuating said supporting means to release the bomb.

10. Bomb control apparatus for movable craft, comprising means for releasably supporting a bomb, conditioning means for rendering said bomb safe or armed, a first link and first control means for actuating said supporting means through said first link to release said bomb, a second link and second control means for actuating said conditioning means through said second link, independently of said first control means, said links being movable longitudinally for actuating said supporting and conditioning means, respectively, third control means and means responsive to operation thereof for sequentially first varying the length of said second link to actuate said conditioning means to render the bomb safe, and thereafter varying the length of said first link to actuate said supporting means to release the bomb, without movement of said first and second control means.

11. Bomb control apparatus for movable craft, comprising means for releasably supporting a bomb, conditioning means for rendering said bomb safe or armed, first means for actuating said conditioning means, second means for selectively actuating said supporting means independently of said first means to release said bombs, emergency release means movable between a first and a second position to actuate said conditioning means to render said bombs safe, auxiliary means movable only in response to actuation of said conditioning means by said emergency release means, and means responsive only to joint movement of said emergency release means and actuation of said auxiliary means for actuating said supporting means to release said bomb.

12. Bomb control apparatus as described in claim 10, in which said links each include a pair of spaced elements, locking means normally interconnecting each pair of elements in predetermined spaced relation, spring means interconnecting each pair of elements and tending to move them into spaced relation different from their said predetermined spaced relation and such as to actuate their associated supporting and conditioning means into releasing and safing positions, respectively, and emergency control means for releasing said locking means.

13. Bomb control apparatus as described in claim 10, in which each link includes a pair of spaced elements supported for substantially similar movement, spring means interconnecting each pair of elements and tending to urge them together to thereby shorten said links and move the said supporting means into bomb-releasing position and move the said conditioning means into bomb-safing position, strut means interconnecting each pair of spaced elements and maintaining them in spaced relation against the force of said spring means, said struts being releasable from one associated spaced element, said means responsive to operation of said third control means including mechanism directly responsive to movement of said third control means for releasing the strut associated with said spaced elements in the second link, and mechanism responsive only to joint movement of said third control means and contraction of the spring associated with said second link, for releasing the strut associated with said first link.

14. Bomb control apparatus for movable craft, comprising means for releasably supporting a bomb, conditioning means for rendering said bomb safe or armed, first means for actuating said supporting means to release said bomb, and second means for actuating said conditioning means independently of said first means, control means movable through a predetermined distance, means completely responsive to movement of said control means for actuating said conditioning means, and means completely responsive only to joint movement of said control means and actuation of said conditioning means for actuating said supporting means to release said bomb.

EDGAR SCHMUED.